US012810406B2

(12) United States Patent
Cowan et al.

(10) Patent No.: US 12,810,406 B2
(45) **Date of Patent: *Nov. 24, 2026**

(54) TEMPORAL BOUNDS OF WILDFIRES

(71) Applicant: X Development LLC, Mountain View, CA (US)

(72) Inventors: Eliot Julien Cowan, Atherton, CA (US); Avery Noam Cowan, Atherton, CA (US)

(73) Assignee: X Development LLC, Mountain View, CA (US)

( * ) Notice: Subject to any disclaimer, the term of this patent is extended or adjusted under 35 U.S.C. 154(b) by 290 days.

This patent is subject to a terminal disclaimer.

(21) Appl. No.: 18/787,405

(22) Filed: Jul. 29, 2024

(65) Prior Publication Data

US 2025/0104208 A1 Mar. 27, 2025

Related U.S. Application Data

(63) Continuation of application No. 17/354,842, filed on Jun. 22, 2021, now Pat. No. 12,051,181.

(51) Int. Cl.
*G06T 7/00* (2017.01)
*G06F 16/587* (2019.01)

(52) U.S. Cl.
CPC .......... *G06T 7/0002* (2013.01); *G06F 16/587* (2019.01); *G06T 2207/10032* (2013.01); *G06T 2207/30188* (2013.01)

(58) Field of Classification Search
CPC ..................... G06T 7/00; G06T 7/0002; G06T 2207/10032; G06T 2207/30188;
(Continued)

(56) References Cited

U.S. PATENT DOCUMENTS 4,276,939 A 7/1981 Atack
5,153,722 A 10/1992 Goedeke et al.
(Continued)

FOREIGN PATENT DOCUMENTS

CN 109118001 A 1/2019
CN 110009031 A 7/2019
(Continued)

OTHER PUBLICATIONS

Artés, Tomàs, et al. "A global wildfire dataset for the analysis of fire regimes and fire behaviour." Scientific data 6.1 (2019): 296. (Year: 2019).*

(Continued)

*Primary Examiner* — Oneal R Mistry
*Assistant Examiner* — Duy Tran
(74) *Attorney, Agent, or Firm* — Fish & Richardson P.C.

(57) ABSTRACT

Methods, systems, and apparatus, including computer programs encoded on computer storage media, for generating a temporal range of a fire. In some implementations, a server obtains a date when a fire occurred within a region. The server obtains satellite imagery of the region from before the date when the fire occurred. The server generates a first statistical distribution from the satellite imagery. The server determines a start date of the fire using the first statistical distribution. The server obtains second satellite imagery of the region from before and after the start date. The server selects a second set of imagery from the second satellite imagery from before the start date. The server generates a second statistical distribution from the second set of imagery. The server determines an end date of the fire using the second statistical distribution. The server provides the start date and the end date for output.

20 Claims, 4 Drawing Sheets

(58) Field of Classification Search
CPC ................. G06T 7/0014; G06T 7/0016; G06T 2211/428; G06F 16/58; G06F 16/587; G06F 16/5866; G08B 17/00; G08B 17/005; G08B 17/12; G08B 17/125; G08B 17/117; G08B 17/103; G08B 13/19604; A62C 3/02; A62C 3/0228; A62C 3/0271; H04W 4/021; H04W 4/025
See application file for complete search history.

(56) References Cited

U.S. PATENT DOCUMENTS

| | | | | |
|---|---|---|---|---|
| 5,767,776 | A | 6/1998 | Wong et al. | |
| 5,850,182 | A | 12/1998 | Schuler | |
| 2012/0224772 | A1* | 9/2012 | Mitchell | G06V 20/176 382/190 |
| 2013/0336526 | A1* | 12/2013 | Cetin | G06T 7/254 382/103 |
| 2016/0132714 | A1 | 5/2016 | Pennypacker | |
| 2018/0189564 | A1* | 7/2018 | Freitag | G06F 18/214 |
| 2018/0336452 | A1* | 11/2018 | Tschernezki | G06N 3/044 |
| 2020/0155882 | A1 | 5/2020 | Tohidi et al. | |
| 2021/0097850 | A1* | 4/2021 | Ton-That | G06F 16/587 |
| 2021/0110136 | A1 | 4/2021 | Ganti et al. | |

FOREIGN PATENT DOCUMENTS

| | | | | |
|---|---|---|---|---|
| CN | 112949515 A | | 6/2021 | |
| JP | 2012-227920 A | | 11/2012 | |
| WO | WO 2014/179482 | | 11/2014 | |
| WO | WO 2020/132031 | | 6/2020 | |
| WO | WO-2020132031 A1 | * | 6/2020 | A62C 3/0271 |

OTHER PUBLICATIONS

Artés et al., "A global wildfire dataset for the analysis of fire regimes and fire behaviour," Scientific data, Nov. 29, 2019, 6(1):296, 20 pages.
International Preliminary Report on Patentability International Appln. No. PCT/US2022/018651, dated Jan. 4, 2024, 9 pages.
International Search Report and Written Opinion in International Appln. No. PCT/US2022/018651, dated Jun. 22, 2022, 14 pages.
Schroeder et al., "Active Fire Detection Using Landsat-8/OLI Data," Remove Sensing of Environment, 2016, pp. 210-220.
Notice of Acceptance in Australian Appln. No. 2022297244, mailed on Mar. 24, 2025, 3 pages.
Office Action in Chilean Appln. No. 202303810, mailed on Mar. 4, 2025, 24 pages (with machine translation).
Decision to Grant Patent in Japanese Appln. No. 2023-577281, mailed on May 19, 2025, 5 pages (with English translation).
Office Action in Chilean Appln. No. 202303810, mailed on Jun. 11, 2025, 20 pages (with machine translation).
Extended Search Report in European Appln. No. 25163599.1, Jul. 30, 2025, 6 pages.
Office Action in Australian Appln. No. 2022297244, dated Jan. 21, 2025, 4 pages.
Office Action in Japanese Appln. No. 2023-577281, dated Dec. 25, 2024, 8 pages (with English translation).
Notice of Allowance in Australian Appln. No. 2025204518, mailed on Jul. 23, 2026, 3 pages.
Office Action in Australian Appln. No. 2025204518, dated May 22, 2026, 2 pages.
Office Action in Japanese Appln. No. 2025-097472, dated May 8, 2026, 5 pages (with English translation).

* cited by examiner

TEMPORAL BOUNDS OF WILDFIRES

CROSS-REFERENCE TO RELATED APPLICATION

This is a continuation of U.S. application Ser. No. 17/354,842, filed on Jun. 22, 2021, the disclosure of which is considered part of and is incorporated by reference in the disclosure of this application.

TECHNICAL FIELD

This specification generally relates to computer simulations, and one particular implementation relates to generating a temporal range of a wildfire using statistical distributions and satellite imagery.

BACKGROUND

Wildfires, which can include bushfire, wild land fire, rural fire, or others, can occur in various geographic regions. A wildfire can originate in one geographic region and spread to another geographic region over a period of time. Wildfires may be caused by factors such as climate, vegetation, and even human activity, to name a few examples.

SUMMARY

The techniques described in this specification generate a temporal range of a historic wildfire over a geographic region. In particular, a server can generate the temporal range that includes a start date and an end date of a wildfire given its spatial bounds in the geographic region and a date the wildfire occurred at the geographic region. The start date corresponds to the day the wildfire originated. The end date corresponds to the day the wildfire concluded.

The techniques for generating the temporal range of the wildfire are important because this range can be utilized and required by other applications. For example, the server can provide the temporal range as training data for machine learning to predict the length of time of a fire or another machine learning model pipeline. In another example, the server can provide the generated temporal range to a graphical user interface that can display a spread and length of time of a wildfire. In other examples, the server can also provide the generated temporal range to a process that seeks to identify a start date of a currently burning wildfire. In other examples, individuals may want to analyze other sensing data before and after a wildfire has occurred. Automatically detecting start and end dates of a wildfire can help complete these studies. For example, an analyst may need the temporal bounds of a wildfire while attempting to approximate the yearly tree-death count in a particular area due to wildfires.

In some implementations, the server may receive the date in which a wildfire occurred in the geographic region. This date may be the start date, the end date, or some date in between the start and end date. The geographic region can be defined by locational data that can include, for example, longitudinal and latitudinal coordinates as well as regions or areas surrounding these positional coordinates.

The server can communicate with a satellite imagery database to obtain satellite imagery of various geographical regions. The satellite imagery database can store satellite imagery, such as infrared and other satellite data, of the various geographical regions of the earth over various periods of time. The satellite imagery can also include other processed satellite imagery products, e.g., MODIS MCD45A1, which contains burning and quality assurance information on a per-pixel basis. The satellite imagery database can index the satellite imagery by a number of factors, e.g., locational data, time, days, and bounding regions of the geographic areas.

The server can identify and retrieve satellite imagery using the locational data associated with the geographic region and the input date when the fire occurred. In particular, the server can provide the locational data and the input date to the satellite imagery database and receive satellite imagery from a time period before the provided input date. In some implementations, the server can provide the locational data and the input date to the satellite imagery database and receive satellite imagery from a time period before the provided input date and after the provided input date.

In some implementations, the server can generate a statistical distribution based on the obtained satellite imagery of the particular geographic region from the time period previous to the input date. As will be further described below, the server can generate a baseline of satellite imagery that corresponds to a time period prior to the input date, each image in the baseline illustrating the geographical region over the defined time period. Once the server has generated the statistical distribution, the server can then identify the start date of the wildfire.

In some implementations, the server can determine the start date of the wildfire by comparing satellite imagery to the statistical distribution. The server can obtain satellite imagery that corresponds to a time period of the geographical region prior to the input date, e.g., a time period of the geographical region prior to three months behind the input date. The three months behind the input date is selected to ensure the statistical distribution is free from and does not include fire-pixels. Moreover, the server can filter satellite imagery within a smallest known perimeter of the wildfire. This will be further explained below. The server can compare the satellite imagery to the statistical distribution to identify the start date of the wildfire.

In some implementations, the server can determine the end date of the wildfire by generating an additional statistical distribution. The server can generate the second statistical distribution based on the obtained satellite imagery of the particular geographic region from the time period prior to the determined start date. For instance, the server filters the obtained satellite imagery within a last known perimeter of the wildfire within the geographic region. As will be further described below, the server can improve the accuracy of identifying the end date by generating the additional statistical distribution with the determined start date rather than with the provided input date. In generating the second statistical distribution, the server can generate another baseline of satellite imagery that corresponds to a time period prior to the determined start date, each image in the baseline illustrating the geographical region over the defined time period. Once the server has generated the second statistical distribution, the server can identify the end date of the wildfire.

In some implementations, the server can determine the end date of the wildfire by comparing satellite imagery to the second statistical distribution. The server can obtain satellite imagery that corresponds to a time period of the geographical region after the determined start date. The selection of satellite imagery from after the time period of the determined start date is required to determine the end date, whereas the selection of satellite imagery from before the time period of the provided input date is required to determine the start date.

The server can then provide the temporal range of the wildfire, e.g., the determined start date and end date of the wildfire, for output. The output may be to a connected client device, a display, or one or more other applications.

In one general aspect, a method is performed by a server. The method includes: obtaining, by a server, a date when a fire occurred within a geographic region; obtaining, by the server, first satellite imagery of the geographic region from before the date when the fire occurred within the geographic region; selecting, by the server, a first set of imagery from the first satellite imagery from before the date when the fire occurred within the geographic region; generating, by the server, a first statistical distribution from the first set of imagery; determining, by the server, a start date of the fire based on a comparison of the first satellite imagery to the first statistical distribution; obtaining, by the server, second satellite imagery of the geographic region from before and after the determined start date when the fire occurred within the geographic region; selecting, by the server, a second set of imagery from the second satellite imagery from before the start date when the fire occurred within the geographic region, wherein an amount of the second set of imagery is smaller than an amount of the first set of imagery; generating, by the server, a second statistical distribution from the second set of imagery from before the start date when the fire occurred within the geographic region; determining, by the server, an end date of the fire based on a comparison of the second satellite imagery occurring after the start date to the second statistical distribution; providing, for output by the server, a range that includes the start date of the fire and the end date of the fire within the geographical region.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes wherein obtaining the date when the fire occurred within the geographic region comprises: obtaining, by the server, a location that describes the geographic region, and obtaining, by the server, the date when the fire occurred within the geographic region, and the date may correspond to the start date of the fire, the end date of the fire, or another date in between the range.

In some implementations, the method includes wherein obtaining the first satellite imagery of the geographic region from before the date when the fire occurred within the geographic region comprises: providing, by the server, the location that describes the geographic region where the fire occurred and the date when the fire occurred to a satellite images database; and in response to providing the location and the date, obtaining, by the server, the first satellite imagery that illustrates the geographic region from a time period prior to the date.

In some implementations, the method includes wherein selecting the first set of imagery from the first satellite imagery from before the date when the fire occurred within the geographic region includes: identifying, by the server, a time period to generate the first statistical distribution, the time period corresponding to a period prior to the date; selecting, by the server, the first set of imagery from the first satellite imagery based on the time period; determining, by the server, an indication if one or more pixels from the selected first set of imagery illustrates fire; and adjusting, by the server, the selected first set of imagery by comparing the one or more pixels that illustrates fire to a threshold value.

In some implementations, the method includes wherein generating the first statistical distribution from the first set of imagery includes: in response to adjusting the selected first set of imagery, generating, by the server, one or more parameters of the first statistical distribution by: determining, by the server, a number of pixels on each day of the first set of imagery that illustrate fire; determining, by the server, an average of the number of pixels on each day of the first set of imagery that illustrate fire; and generating, by the server, the first statistical distribution by setting the determined average to the one or more parameters.

In some implementations, the method includes wherein determining the start date of the fire based on the comparison of the first satellite imagery to the first statistical distribution includes: identifying, by the server, satellite imagery from the first satellite imagery corresponding to a day prior to the date when the fire occurred; determining, by the server, a number of pixels from the identified satellite imagery for the day that appear to illustrate fire; generating, by the server, a likelihood that the satellite imagery from the first satellite imagery includes an indication of fire based on the first statistical distribution and the determined number of pixels that appear to illustrate fire; comparing, by the server, the likelihood to a threshold; and in response to determining the likelihood does not exceed the threshold, obtaining, by the server, another satellite image from the first satellite imagery corresponding to another day prior to the date when the fire occurred for determining the start date.

In some implementations, the method further includes in response to determining the likelihood does exceed the threshold for a particular day, the method includes: obtaining, by the server, additional satellite imagery for a predetermined number of days prior to the particular day; for each day of the predetermined number of days: determining, by the server, a number of active fire pixels from the additional satellite imagery for that day; generating, by the server, a likelihood that the additional satellite imagery for that day does not include an indication based on the first statistical distribution and the determined number of pixels that appear to illustrate fire; and determining, by the server, that the day corresponding to the identified satellite imagery corresponds to the start date of the fire in response to determining each day of the predetermined number of days does not illustrate the fire.

In some implementations, the method includes wherein obtaining the second satellite imagery of the geographic region from before and after the determined start date when the fire occurred within the geographic region includes: providing, by the server, a location that describes the geographic region where the fire occurred and the start date when the fire occurred to a satellite images database; and in response to providing the location and the start date, obtaining, by the server, the second satellite imagery that illustrates the geographic region from a time period prior to and after the start date.

In some implementations, the method includes wherein selecting the second set of imagery from the second satellite imagery from before the start date when the fire occurred within the geographic region, wherein the amount of the second set of imagery is smaller than the amount of the first set of imagery includes: identifying, by the server, a time period to generate the second statistical distribution, the time period corresponding to a period prior to the start date; selecting, by the server, the second set of imagery from the second satellite imagery based on the time period; determining, by the server, an indication if one or more pixels from the selected second set of imagery illustrates fire; and adjusting, by the server, the selected second set of imagery by comparing the one or more pixels that illustrates fire to a threshold value.

In some implementations, the method includes wherein generating the second statistical distribution from the second set of imagery from before the start date when the fire occurred within the geographic region includes: in response to adjusting the selected second set of imagery, generating, by the server, one or more parameters of the second statistical distribution by: determining, by the server, a number of pixels on each day of the second set of imagery that illustrate fire; determining, by the server, an average of the number of pixels on each day of the second set of imagery that illustrate fire; and generating, by the server, the second statistical distribution by setting the determined average to the one or more parameters.

In some implementations, the method includes wherein determining the end date of the fire based on a comparison of the second satellite imagery occurring after the start date to the second statistical distribution includes: identifying, by the server, satellite imagery from the second satellite imagery corresponding to a day after the start date; determining, by the server, a number of pixels from the identified satellite imagery for the day that appear to illustrate fire; generating, by the server, a likelihood that the satellite imagery from the second satellite imagery includes an indication of fire based on the second statistical distribution and the determined number of pixels that appear to illustrate fire; comparing, by the server, the likelihood to a threshold; and in response to determining the likelihood exceeds the threshold, obtaining, by the server, another satellite image from the first satellite imagery corresponding to another day after the date when the fire occurred for determining the end date.

In some implementations, the method further includes in response to determining the likelihood does exceed the threshold for a particular day, the method includes: obtaining, by the server, additional satellite imagery for a predetermined number of days following the particular day; for each day of the predetermined number of days: determining, by the server, a number of pixels from the additional satellite imagery for that day; generating, by the server, a likelihood that the additional satellite imagery for that day does not include an indication based on the second statistical distribution and the determined number of pixels that appear to illustrate fire; and determining, by the server, that the day corresponding to the identified satellite imagery corresponds to the end date of the fire in response to determining each day of the predetermined number of days does not illustrate the fire.

In some implementations, the method includes wherein the first and second statistical distributions are different Poisson distributions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements. The components shown here, their connections and relationships, and their functions, are meant to be examples only, and are not meant to limit the implementations described and/or claimed in this document.

DETAILED DESCRIPTION

Figure 1:
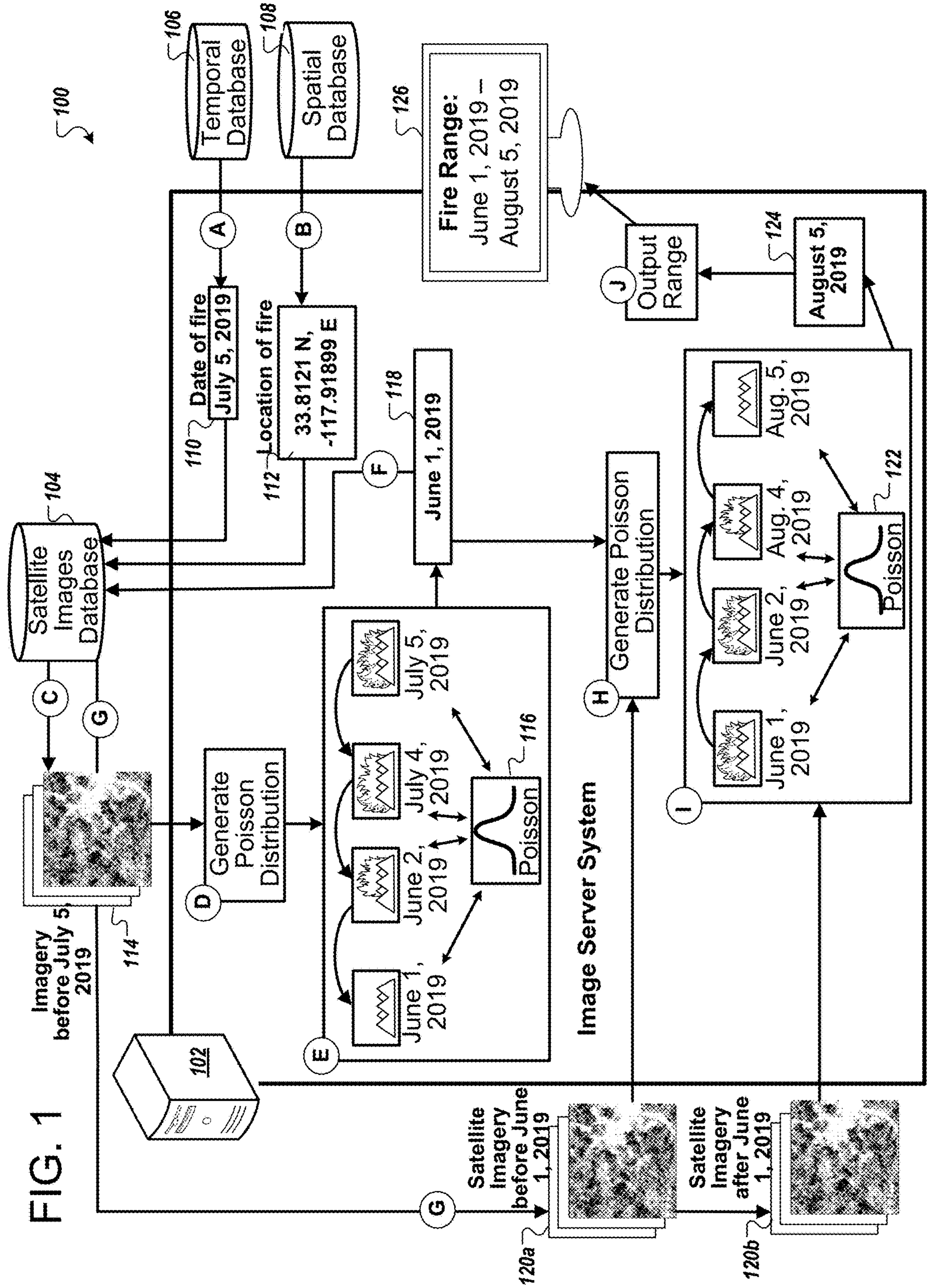
FIG. 1 is a block diagram that illustrates an example of a system for generating a temporal range of a wildfire.

FIG. 1 is a block diagram that illustrates an example of a system 100 for generating a temporal range of a wildfire. The system 100 includes an image server system 102, a satellite images database 104, a temporal database 106, and a spatial database 108. The system 100 also includes a monitor 126 connected to the image server system 102 for displaying and enabling a user to interact with the image server system 102. Briefly, the system 100 can generate a temporal range of a wildfire that has been identified from a date when the wildfire occurred and a corresponding location of the wildfire. The system 100 can generate multiple statistical distributions and compares obtained satellite imagery to the generated statistical distributions to identify the temporal range, e.g., the start date and the end date, of the wildfire.

The system 100 seeks to generate a temporal range of a wildfire because typically start and end dates of a wildfire are often missing from databases storing fire information. By generating and storing this information, the system 100 can add to and improve the overall modeling and monitoring of wildfires. This information can also be useful for various wildfire applications, as will be described below.

In some implementations, the image server system 102 may include one or more servers or computers connected locally or over a network. The system 100 can include a network that can be, for example, a local network, a Wi-Fi network, an intranet, an Internet connection, a Bluetooth connection, or some other connection that enables the image server system 102 to communicate, e.g., transmit and receive, with various databases and various computers. FIG. 1 illustrates various operations in stages (A) through (J) which can be performed in the sequence indicated or another sequence.

The image server system 102 may also communicate with a satellite over a satellite network. The satellite may capture media, e.g., images and videos, of geographic regions of the Earth. The image server system 102 may communicate with the satellite to request for and receive media captured of various geographic regions of the Earth. This will be further described below.

In some implementations, the satellite images database 104 can include one or more databases that store satellite imagery illustrating one or more geographic regions of the Earth. The satellite imagery may include high quality satellite images, medium quality satellite images, noisy satellite imagery, and other satellite imagery. Moreover, the satellite images database 104 can store satellite imagery illustrating one or more geographic regions of the Earth over a period of time. For example, the satellite imagery can include media, e.g., images and video, of a particular geographic region of the Earth over the past 1, 5, 10, 15, or more years previous from a current time. The satellite images database 104 can include satellite imagery for each day over the past time period. In some cases, the satellite images database 104 can include multiple images or multiple videos from each day of the geographic region.

The satellite images database 104 can store satellite media for multiple geographic regions of the Earth over various periods of time. For example, the satellite images database 104 can store satellite imagery for geographic region 1 through geographic region N, and store satellite imagery for various periods of time for each of those geographic regions. In these examples, the satellite images database 104 can store satellite imagery for each day of the past 10 years for geographic region 1 and satellite imagery for each day of the past 20 years for geographic region 2.

In some implementations, the dimensions of the satellite imagery may correspond to the camera utilized on the satellite and the positional location of the satellite. The satellite may navigate the circumference of the Earth at a particular distance from the Earth and capture imagery of the Earth from that distance. For example, satellites may navigate in low orbit around the Earth at a distance of 800 kilometers (km) or 497.097 miles from the Earth. In some implementations, the cameras associated with the satellites may have a zoom capability.

In some implementations, the resolution of the satellite cameras may be set to a standard resolution to ensure uniformity across all satellite imagery. For example, the resolution of the cameras may be set to 375 meters horizontally and vertically when capturing geographic regions of the Earth. In other implementations, different satellites may have different resolution capabilities. As such, the satellite cameras can adjust their zoom capability to ensure resolution uniformity across satellite imagery from each of the satellites.

In the some implementations, the temporal database 106 can include one or more databases that store time periods of satellite imagery captured by the satellite and stored in the satellite images database 104. The time periods can include, for examples, defined dates, date ranges, and time ranges. For example, the temporal database 106 can store a time range of Jan. 1, 2018 to Jan. 1, 2019 or a time range of 12:00 PM on Jan. 1, 2018 to 12:01 PM on Jan. 1, 2019.

Moreover, the temporal database 106 can store further specific date ranges. The more specific date ranges can include specificities down in the hour and minute range. For example, the temporal database 106 can store time ranges of Jan. 1, 2018 at 12:00 PM to Jan. 1, 2019 at 12:30 PM.

In some implementations, the satellite can provide satellite imagery to the satellite images database 104 with metadata. The metadata can include locational data of the geographic region where the satellite imagery was captured, data identifying the satellite that captured the satellite imagery, a date and time when the satellite imagery was captured, and locational data indicating where the satellite was located in space when capturing the satellite imagery. For example, if the satellite captured an image of a geographic region in San Diego, then the satellite can associate the following metadata with the image: (1) locational data of the geographic region as 32.7515,−117.1364, (2) a date of May 19, 2019 at 12:05 PM PT, when the satellite image was captured, (3) data indicating the name and model of the satellite that captured the imagery, e.g., SATELLITE111 and Model 1, (4) locational data of the satellite when the image was captured, such 800 km above the locational coordinates of 32.7515,−117.1364. The satellite images database 104 can match the date and location of the wildfire provided by the image server system 102 to the metadata of the satellite imagery to identify requested satellite imagery.

The image server system 102 can distribute the metadata to each of the databases in system 100, accordingly. For example, when the satellite provides the satellite imagery to the image server system 102, the image server system 102 can provide the satellite imagery and the metadata to the satellite images database 104 for storage purposes. Additionally, the image server system 102 can extract the temporal data from the metadata and provide the temporal data to the temporal database 106. The temporal data can indicate the day and time at which the satellite image was captured by the satellite. Additionally, the image server system 102 can extract the locational data of the geographic region from the metadata and provide the locational data to the spatial database 108. The image server system 102 can perform this extraction and distribution process for each satellite image obtained from the satellite.

In some implementations, the spatial database 108 can include one or more databases that store locational data of locations identified in satellite imagery captured by the satellite and stored in the satellite images database 104. The locational data can include, for example, latitude and longitude coordinates, addresses, names of landmarks, and dates that identify cities, states, counties, and other data that identifies locations on the Earth.

The spatial database 108 can include one or more bounding boxes that illustrate a location of an area, e.g., a geographic region or coordinates, that illustrates where a wildfire initiated. The bounding box may include a polygon, for example, that illustrates the geographic region where the wildfire starts or an area around the geographic region where the fire starts. The bounding box may be applied to the satellite imagery so that the image server system 102 can determine where to count the fire pixels. For example, as will be further described below, the image server system 102 can count the number of fire pixels within the bounding box applied to the satellite imagery.

Within the polygon may include one or more geographic features and one or more features of a wildfire. For example, the one or more features of the wildfire can include one or more regions that have not been on fire, one or more regions that are actively on fire, one or more burned regions that were recently on fire, and one or more scarred regions that resulted from fires. The spatial database 108 can be populated by the image server system 102 or another external service.

The image server system 102 can store data in the temporal database 106 and the spatial database 108 in response to the image server system 102 obtaining satellite imagery. In some implementations, the image server system 102 can store temporal and spatial data from the metadata of the satellite imagery to ensure that the satellite images database 104 can provide the proper satellite images when requested. In this case, if the image server system 102 requests for satellite imagery outside of the data included within the temporal database 106 and the spatial database 108, then the satellite images database 104 may return an error message indicating that the requested data is outside of the satellite imagery range.

In some implementations, processes external to the image server system 102 may perform the population of the satellite images database 104, the temporal database 106, and the spatial database 108. In this case, the image server system 102 may perform processes related to determining the temporal range of the wildfire by accessing the temporal database 106, the spatial database 108, and the satellite images database 104.

During stage (A), the image server system 102 can receive an input date 110 when wildfire occurred. As illustrated in system 100, the input date 110 corresponds to Jul. 5, 2019. In some implementations, an external process may access the temporal database 106 and provide the input date 110 to the image server system 102. In some implementations, a user interacting with the image server system 102 may request for the temporal range of a wildfire and provide the input date 110 to the image server system 102. Additionally, the input data can be provided by a fire metadata database, for example. The input date 110 can indicate a day in which a wildfire occurred and additionally, provide an indication to the image server system 102 that the satellite images database 104 does include satellite imagery of the wildfire at a corresponding geographic location. In other implementations, the image server system 102 can provide a request to the temporal database 106 to return a date when wildfire occurred in a particular geographic location.

During stage (B), the image server system 102 can receive a location 112 where the wildfire occurred based on the input date 110 of the wildfire. As illustrated in system 100, the location of the wildfire can correspond to locational coordinates, for example, such as 33.8121 N,−117.91899 E. The location 112 may also include other descriptors such as, for example, names of landmarks, name of cities, name of geographical regions or specific addresses.

In some implementations, the image server system 102 may retrieve a polygon from the spatial database 108 that indicates where the wildfire originally started. The image server system 102 can obtain the polygon based on the input date 110 and the location 112. To limit the amount of processing performed by the image server system 102, the image server system 102 can apply the obtained polygon to the obtained satellite imagery after retrieving the satellite imagery from the satellite images database 104. In this case, the polygon can spatially restrict the number pixels searched for by the image server system 102 in the satellite imagery.

The input date 110 does not necessarily indicate to the imager server system 102 the starting date or the ending date of the wildfire, even though the input date 110 may in fact be the starting date or the ending date of the wildfire. Rather, the input date 110 may correspond to a another date, such as a date in-between the start and end date, of when the wildfire was active or ongoing. The image server system 101 can determine where the input date 110 falls within the temporal range of the wildfire by continuing with the process, as further described below.

During stage (C), the image server system 102 can provide the input date 110 when the wildfire occurred and the location 112 where the wildfire occurred to the satellite images database 104. The image server system 102 can provide the input date 110 and the location 112 to the satellite images database 104 to obtain satellite imagery at the location and a time period range prior to the input date 110. In some implementations, the image server system 102 can indicate to the satellite images database 104 a time period prior to the input date 110 for obtaining satellite imagery. The time period can include, for example, one year prior to the input date 110, two years prior to the input date 110, five years prior to the input date 110, or some other time period prior to the input date 110 that is sufficient to build the statistical distribution. For example, the image server system 102 may require at least one year of satellite imagery prior to the input date 110 for building the statistical distribution, and consequently, request two years or more of satellite imagery from the satellite images database 104 prior to the input date 110.

In some implementations, the satellite images database 104 can index its stored satellite imagery by location. For example, the image server system 102 can additionally provide the location 112 to the satellite images database 104 and the satellite images database 104 can access the satellite imagery that include the location 112, e.g., locational coordinates or another geographical or locational description, in its field of view. The satellite images database 104 can determine the location 112 in the field of view of corresponding satellite imagery by analyzing the metadata of the satellite imagery.

Then, the satellite images database 104 can filter those images that include the location 112 by a temporal range. For example, the satellite images database 104 can exclude or filter out those satellite images that have timestamps and dates after the input date 110 and exist outside the time period prior to the input date 110. For example, the image server system 102 can indicate to the satellite images database 104 to provide all satellite imagery showing the location 112 from two years prior to the Jul. 5, 2019 date, e.g., Jul. 5, 2017, to Jul. 5, 2019. The image server system 102 can exclude all satellite imagery showing the location 112 prior to the Jul. 5, 2017 date and after the Jul. 5, 2019 date.

The satellite images database 104 can identify and provide the satellite imagery 114 that meets the image server system's 102 criteria back to the image server system 102. As illustrated in system 100, the satellite imagery 114 can include one or more images or videos of satellite imagery including the location 112 and have a timestamp falling in the temporal range of two years prior to the input date 110 to the input date 110. In some examples, the satellite imagery 114 may include satellite imagery for each day from Jul. 5, 2017 to Jul. 5, 2019 or may include multiple satellite images or videos for each day from Jul. 5, 2017 to Jul. 5, 2019. In some cases, one or more of the days between Jul. 5, 2017 and Jul. 5, 2019 may not include satellite imagery if the satellite did not capture imagery around the location 112 on those days.

In some implementations, each media of the satellite imagery 114 can include a specified resolution. For example, and as mentioned above, each media may include a resolution of 325 meters in the horizontal direction and 325 meters in the vertical direction. This resolution enables the image server system 102 not to only visually inspect the location 112 but also the surrounding areas of location 112. As wildfires can originate in a specific location and move to another location, by viewing a wide area proximate to the location 112, such as in a bounding box around the location 112, the image server system 102 can improve its determination of a start and end date of a wildfire. For example, the bounding box or polygon can correspond to an area within the satellite imagery that indicates an area encompassing the wildfire. The bounding box can include the smallest area that covers the wildfire within the satellite imagery or an arca that encompasses both the wildfire and outside the wildfire.

Additionally, if the location 112 falls on an edge of the satellite imagery 114, the satellite images database 104 can also provide satellite imagery adjacent to the location 112 in the edged satellite image. In this case, the image server system 102 can ensure that the location 112 shown in the satellite image is always surrounded by an area of imagery, e.g., image resolution, even in the case that the location 112 lands on an edge, e.g., vertical or horizontal, of the satellite imagery. In some implementations, the image server system 102 may indicate to the satellite images database 104 a bounding region or an area around the location 112. Then, as the satellite images database 104 identifies satellite imagery that meet the criteria of the image server system 102, the satellite images database 104 can identify additional satellite imagery to provide if the originally identified satellite imagery does not fall within the criteria of the bounding region or area.

In some implementations, the satellite images database 104 can provide the identified satellite imagery 114 to the image server system 102 over a network. In other implementations, the satellite images database 104 can provide the indexes of the identified satellite imagery 114 to the image server system 102 for performing the retrieval of the satellite imagery 114. In some cases, the satellite images database 104 can also provide a link to the identified satellite imagery 114 for quick retrieval by the image server system 102. The link can include, for example, a zip file, access to cloud storage, or some other form for download of the satellite imagery 114.

During stage (D), the image server system 102 can generate a statistical distribution based on the identified satellite imagery 114. In some implementations, the image server system 102 can generate the statistical distribution for comparison to satellite imagery to determine a likelihood of wildfire in the satellite imagery. In particular, the statistical distribution corresponds to a frequency model of satellite noise in a particular geographic region over a period of time. In some examples, the statistical distribution may be modeled with a Poisson distribution, a Gaussian distribution, or a Normal distribution.

In some implementations, the satellite imagery 114 can illustrate various landmarks, buildings, roads, and other geographic features. The other geographic features can include, for example, rivers, oceans, lakes, hills, flat lands. The satellite imagery 114 can also illustrate people, vehicles, animals, and other features commonly found in geographic regions. The satellite imagery 114 can also include noisy characteristics, such as glare, glint, and distorted pixels, which can make it difficult for the image server system 102 to distinguish wildfire from noise.

In some implementations, the satellite imagery can illustrate various regions of fire. These regions can include, for example, one or more regions that have not been on fire, one or more regions that are actively on fire, one or more burned regions that were recently on fire, and one or more scarred regions that resulted from fires. Regions that have not been on fire can show one more geographic regions that have been untouched by fire. Regions that are actively burning can include, for example, regions that illustrate active fire, smoke, or embers. Burned regions that were recently on fire can illustrate geographic regions in which the fire once burned but is no longer active but those geographic regions are still hot and dangerous. Scarred regions can illustrate geographic regions in which once burned but is no longer active and those geographic regions are no longer hot or dangerous.

The image server system 102 can generate and utilize the statistical distribution to improve the accuracy of the detection of ongoing wildfire in satellite imagery. In particular, the image server system 102 can initiate the process of comparing satellite imagery to a generated statistical distribution by first identifying a number of pixels in the satellite imagery 114 that appear to illustrate wildfire. Some of the identified pixels may not illustrate wildfire and rather, illustrate noisy pixels. To mitigate this issue, the image server system 102 can compare the number of pixels identified in the satellite imagery 114 that appear to illustrate wildfire to the generated statistical distribution to filter out the imagery with the noisy characteristics.

To be able to make such a comparison, the image server system 102 can build the statistical distribution with historical satellite imagery obtained from the satellite images database 104 that illustrates the same location as location 112 that does not illustrate ongoing wildfire. For example, the image server system 102 must first identify a period of time previous to the input date 110 within the obtained satellite imagery 114 that does not illustrate wildfire. In addition to identifying a date three months prior to the input date 110 that ensures no wildfire is found in corresponding satellite imagery, the image server system 102 can identify historical weather reports and other climate databases to confirm whether fire existed in certain geographic regions, such as the geographic region identified in the satellite imagery. By generating a satellite imagery baseline, the image server system 102 can identify any pixels in satellite imagery that are outside the norm of the baseline and indicate that the corresponding satellite imagery appears to illustrate wildfire. In this case, the image server system 102 first determines a date three months prior to the input date 110. For the example of system 100, the date three months prior to the input date 110 is Apr. 5, 2019.

The image server system 102 can determine the date three months prior to the input date 110 because generally, wildfires do not last longer than three months. By identifying a date that is three months prior to the input date 110, the image server system 102 can safely assume that the same wildfire identified by the input date 110 and the location 112 is not active or has not been lit in the corresponding satellite imagery, e.g., satellite imagery of the date three months prior to the input date 110. In some implementations, if the image server system 102 identifies wildfire still occurring in the satellite imagery 114 at the date three months prior to the input date 110, the image server system 102 may identify an even earlier date. In some cases, the image server system 102 can identify whether one or more other wildfires were active during the time period between the input date 110 and the date three months prior to the input date 110. The one or more other wildfires can correspond to wildfires that have different origins and did not cause the wildfire identified by the input date 110. The image server system 102 can access one or more public wildfire databases to determine if another wildfire was active during this time window. However, the occurrence of another wildfire being active in the same geographic region as the wildfire identified by input date 110 is rare.

For example, the image server system 102 may move the date from Apr. 5, 2019 back one month to, e.g., Mar. 5, 2019. If the image server system 102 determines no pixels in the satellite imagery 114 on the date of Mar. 5, 2019 appear to illustrate wildfire, then the image server system 102 can set Mar. 5, 2019 as an end date for the time range to build the statistical distribution. The image server system 102 can perform the process of identifying the end date for the time range iteratively, e.g., continuing to move back a day, a month, or a week until a start date with no wildfire is illustrated in the corresponding satellite imagery. In this case, the image server system 102 cannot set this determined end date as the actual start date of the wildfire because the wildfire may not actually become active for a day, a week, or a month after the end date, for example.

In some implementations, the image server system 102 can determine a date one year prior to the determined end date for the time range. The date one year prior to the determined end date for the time range is known as the start date for the time range. The image server system 102 can identify the start date and the end date of the time range for identifying satellite imagery to build the statistical distribution. Continuing with the example of system 100, the image server system 102 can determine the start date for the time range to be Apr. 5, 2018, e.g., one year prior to the end date of Apr. 5, 2019.

However, for the image server system 102 to set the start date to be Apr. 5, 2018, the image server system 102 can use data from an external database of historical fires to ensure no satellite imagery illustrating the location 112 illustrates active wildfire between the start date, e.g., Apr. 5, 2018, and the end date, e.g., Apr. 5, 2019. If the image server system 102 identifies data from the external database of historical fires that indicates wildfire existed or was active in the geographic region from Apr. 5, 2018 to Apr. 5, 2019, for example, then the image server system 102 can adjust the start date or the end date accordingly. The manner in which the image server system 102 detects or identifies ongoing wildfire in the satellite imagery will be further described below.

For determining whether the satellite imagery within the time range illustrates ongoing wildfire, the image server system 102 may identify the number of fire pixels in the satellite image and compare the number of fire pixels to a threshold value. For example, the image server system 102 may execute a fire detection algorithm on the satellite image to determine how many pixels include fire. The fire detection algorithm can include, for example, an active fire detection algorithm. If the number of fire pixels in a satellite image is less than the threshold value, then the image server system 102 can indicate that the particular satellite image does not include fire.

For example, the image server system 102 can select a subset of satellite imagery from satellite imagery 114 between Apr. 5, 2018 and Apr. 5, 2019, inclusive. The image server system 102 can process each image or video from each day in that time range and search for pixels that appear to illustrate wildfire. If the image server system 102 detects pixels appearing to illustrate wildfire on Apr. 8, 2018, e.g., the number of pixels being greater than the threshold, and on no other days, then the image server system 102 can adjust the time range to Apr. 9, 2018 to Apr. 5, 2019. Alternatively, if the image server system 102 detects pixels appearing to illustrate wildfire on Apr. 1, 2019, e.g., the number of pixels being greater than the threshold, then the image server system 102 can adjust the time range to Apr. 5, 2018 to Mar. 31, 2019.

In some cases, if the image server system 102 detects pixels appearing to illustrate wildfire in the middle of the time range, such as on Dec. 1, 2018 or Nov. 1, 2018, e.g., the number of pixels being greater than the threshold, then the image server system 102 can drop those days from the time range and adjust the time range to multiple continuous sub-time ranges. For example, the continuous sub-time ranges can include Apr. 5, 2018-Oct. 31, 2018 to Nov. 2, 2018-Nov. 31, 2018 to Dec. 2, 2018-Apr. 5, 2019. Thus, the image server system 102 can create a single continuous time range or multiple continuous sub-time ranges for building the satellite imagery distribution.

In some implementations, the image server system 102 can determine a date nine months prior to the date three months behind the input date 110. For example, if the image server system 102 determines that the satellite imagery at the date of Apr. 5, 2019 does not appear to illustrate wildfire, then the image server system 102 can identify a date nine months prior to the Apr. 5, 2019 date for the start of the time range. The end date of the time range becomes Apr. 5, 2019. The date nine months prior to the Apr. 5, 2019 date corresponds to Jul. 5, 2018. Thus, the image server system 102 can build the statistical distribution based on the time range of Jul. 5, 2018 to Apr. 5, 2019.

The image server system 102 can generate a statistical distribution more quickly and save on processing speed/power if the image server system 102 bases the statistical distribution on the shorter nine-month time range, e.g., Jul. 5, 2018 to Apr. 5, 2019. However, the image server system 102 can generate a more accurate and representative statistical distribution of the location 112 if the image server system 102 bases the statistical distribution on the longer one year time range, e.g., Apr. 5, 2018 to Apr. 5, 2019. In some examples, typically, wildfires can occur in certain regions, e.g., California area, during a standard three-month fire season beginning around August and September. For fires that occur during this fire season, a nine-month window can be selected, instead of the one-year window, to decrease the likelihood that satellite imagery is selected that accidentally includes wildfire from the previous year's fire season in the baseline distribution. In some implementations, the image server system 102 can remove the fire season from the satellite imagery corresponding to the time range to decrease the chance a fire is accidentally included in the time range or the baseline distribution.

In response to identifying the satellite imagery in the identified time range from the satellite imagery 114, the image server system 102 can determine a number of pixels on each day in the identified satellite imagery that appear to illustrate wildfire. For example, the image server system 102 can analyze the satellite imagery on each day between the identified time range of Apr. 5, 2018 to Apr. 5, 2019 and determine a number of fire pixels on each day. In some implementations, the image server system 102 can apply the retrieved polygons from the spatial database 108 to identified satellite imagery. By cropping the identified satellite imagery to the polygons the image server system 102 can reduce the amount of pixels searched over in the identified satellite imagery. In this case, the image server system 102 can search over pixels in the identified satellite imagery within the retrieved polygon.

The image server system 102 may count 10 fire pixels on Apr. 5, 2018, 11 fire pixels on April 6, and continue counting satellite imagery for each day until Apr. 5, 2019, for example. The same process holds true in the case of analyzing the satellite imagery in the one-year time range or a time range that has multiple continuous sub-time ranges.

In some implementations, the image server system 102 can normalize the number of fire pixels detected for each day. For example, the image server system 102 may analyze one satellite image for Apr. 5, 2018, analyze fifty satellite images for Apr. 6, 2018, and ten satellite images for Apr. 7, 2018. The image server system 102 can divide the average number of fire pixels detected for each day to normalize the detections. The reason for normalizing is to ensure that the generated statistical distribution creates a smooth curve. If the values are not normalized, then the curve of the generated distribution may include jagged edges and skew the probability predictions.

In some implementations, after determining the number of fire pixels for each day in the satellite imagery or within the polygon of the satellite imagery of the identified time range, the image server system 102 can generate the statistical distribution. For example, the image server system 102 can generate a frequency histogram of the number of pixels identified in the satellite imagery that appear to illustrate ongoing wildfire. The frequency histogram can be illustrated in a graphical representation, the number of days on the X-axis and the number fire pixels in the Y-axis.

The image server system 102 can then determine the mean of the frequency histogram and fit the mean or other data descriptors, such as standard deviation, to a statistical distribution. For example, the image server system 102 can fit the mean of the frequency histogram to a Poisson distribution or another statistical distribution. In a Poisson distribution, the mean is equivalent to the variance. In the case of system 100, the average number of pixels identified to illustrate wildfire in a given time interval, e.g., one year, is equivalent to the variance of the Poisson distribution.

In some implementations, if a significant number of wildfire events are unintentionally included in the baseline distribution, the baseline distribution may no longer have an equivalent mean and variance. In other words, the baseline distribution may no longer follow a Poisson distribution. In this case, the image server system 102 can perform a test that determines whether the mean and variance for the baseline distribution, e.g., statistical distribution, is equivalent. The test is performed by analyzing the mean of samples in the statistical distribution and analyzing the variance of the samples, for example. If the image server system 102 detects the mean and variance for the statistical distribution is not equivalent, then the image server system 102 can adjust the time range and corresponding satellite imagery and build a new statistical distribution based on the satellite imagery from the adjusted time range. The image server system 102 can repeat this process until a statistical distribution is built that has an equivalent mean and variance. Once the statistical distribution is built, only one parameter, such as the mean number of pixels that appear to illustrate wildfire, is required to determine the probability of the event. The following equation illustrates the probability distribution function for a Poisson random variable:

$$f(k;\lambda) = \frac{(\lambda^k * e^{-\lambda})}{k!} \tag{1}$$

In Equation 1 above showing the Poisson distribution, the value λ corresponds to the average number of pixels appearing to illustrate wildfire from the baseline. The value k corresponds to a random variable or the number of times an event occurs, e.g., the number of pixels appearing to illustrate wildfire from an input image. The resultant value, f(k; λ), corresponds to a probability representative of the Poisson probability distribution function. In some implementations, the image server system 102 can return the Poisson distribution 116 once the value λ has been determined.

The Poisson distribution 116 can provide a resultant value during the comparison with an input image, the resultant value indicating a likelihood that an event is to occur in a given time period. In particular, the probability density function (PDF) of the Poisson distribution 116 can return a probability that a particular day with k counted pixels occurred naturally from the distribution of noise. Thus, the lower the value outputted by the PDF, the more likely an external force, e.g., a wildfire, contributed to the count of the k value. Alternatively, the higher the value output by the PDF, the less likely an external force contributed to the count of the k value, and an indication that the image more closely resembles that from the baseline distribution. For example, if the probability corresponds to a low value, such as 0.01, then the image server system 102 can determine that the image likely illustrates wildfire. Alternatively, if the probability corresponds to a high value, such as 0.90, then the image server system 102 can determine that the image likely does not illustrate ongoing wildfire.

During stage (E), the image server system 102 can determine the starting date of the wildfire based on the generated statistical distribution and the satellite imagery 114. For example, as illustrated in system 100, the image server system 102 can generate a statistical distribution 116 during stage (D). The image server system 102 then compares each of the satellite imagery 114 starting with the input date 110 of Jul. 5, 2019 to the generated statistical distribution 116.

First, the image server system 102 determines a number of pixels in the satellite imagery on Jul. 5, 2019, from satellite imagery 114, that appear to illustrate wildfire. In some implementations, the image server system 106 can use a fire detection algorithm to determine whether a pixel illustrates wildfire. In other implementations, the image server system 106 can analyze a pixel's brightness to determine whether a pixel illustrates wildfire. For example, the image server system 102 may determine the number of pixels that appear to illustrate wildfire in the satellite imagery on Jul. 5, 2019 by analyzing each pixel's brightness and comparing the pixel's brightness to a threshold value. For example, the image server system 102 can determine a pixel's brightness by averaging the red, blue, and green (RGB) values of a pixel. In some implementations, the image server system 106 can analyze wavelengths outside of RGB values to determine which pixels are on fire. For example, the wavelengths outside of RGB can include infrared wavelengths. The lower the average, the less bright the pixel and vice versa. In another example, the image server system 102 can determine a pixel's brightness by calculating the relative luminance value using the following formula:

$$Y = 0.2126 * R + 0.7152 * G + 0.0722 * B \tag{2}$$

Equation 2 above illustrates calculating a relative luminance value for a pixel based on the pixel's RGB values. For example, if a pixel's red value is 100, green value is 100, and blue value is 100, then the relative luminance value is 100. The greater the relative luminance value, the greater the brightness of the pixel. Although, the brightness of the pixel does not indicate whether the pixel illustrates wildfire or noise, the brightness of the pixel can be an indication that a pixel appears to be on fire. In some implementations, the image server system 102 can also analyze an intensity of the pixel to determine whether wildfire exists in the pixel. In other implementations, the image server system 102 can rely on external sources to determine whether a corresponding pixel illustrates wildfire. For example, the image server system 102 can utilize a Visible Infrared Imaging Radiometer Suite (VIIRS) Active Fire Product that was developed by NASA to determine where a pixel was or was not on fire by combining the infrared band from the satellite imagery with the RGB bands of the pixel. Typically, each satellite includes their own detection algorithm that is optimized for the specifications of the corresponding equipment.

In some implementations, the image server system 102 can apply the polygon obtained from the spatial database 108 to the satellite imagery on the particular day. The image server system 102 can determine the number of pixels that appear to illustrate wildfire within the polygon of the satellite imagery on Jul. 5, 2019 by analyzing each pixel's brightness or intensity and comparing the pixel's brightness to a threshold value. By incorporating the polygon on the satellite imagery, the image server system 102 can reduce processing complexity and decrease processing time because a smaller amount of pixels in the satellite imagery is searched.

The image server system 102 can calculate the brightness for each pixel in the satellite imagery of Jul. 5, 2019 or within the polygon applied to the satellite imagery of Jul. 5, 2019. Then, for each pixel, the image server system 102 can compare the brightness of each pixel to a threshold value. For example, the image server system 102 can designate a threshold value of 50 or another brightness value. If a particular pixel of the satellite imagery is greater than the threshold value, then the image server system 102 can deem that pixel to be included in the count. The image server system 102 repeats this process for each pixel of the satellite image.

In some implementations, the image server system 102 can identify pixels that illustrate wildfire within the satellite imagery. Contextually, the pixels that can illustrate wildfire can correspond to regions within the polygon, e.g., regions that are actively on fire and potentially burned regions that were recently on fire. If the burned regions that were recently on fire include one or more embers from the fire, the image server system 102 may detect and identify pixels associated with those embers in the satellite imagery as pixels being on fire. However, pixels associated with regions that have not been on fire and scarred regions that resulted from fire will not be detected by the image server system 102 as illustrating fire.

Then, the image server system 102 can input the counted number of pixels in the satellite imagery into the value k of Equation 1 of the Poisson distribution 116. For example, the image server system 102 may have fit the frequency histogram to a Poisson distribution and determined the following equation:

$$f(k; 5) = \frac{(5^k * e^{-5})}{k!} \quad (3)$$

As illustrated in Equation 3, the number five in place for value λ, which corresponds to the average number of pixels appearing to illustrate wildfire from the baseline distribution each day. Moreover, the value λ can describe a wideness of the Poisson distribution curve. Equation 3 represents a probability density function or a continuous probability density function of the Poisson distribution. The value k corresponds to the number of pixels found in the satellite image of Jul. 5, 2019 that appear to illustrate wildfire. For example, if the pixel count for the particular image corresponds to a value of 6, Equation 3 would result with the following value:

$$f(6; 5) = \frac{(5^6 * e^{-5})}{6!} = 0.1462 \quad (4)$$

As shown in Equation 4, the image server system 102 calculated a probability of 14.62% that the event of six fire pixels is likely to occur in the baseline distribution. Moreover, the calculation probability indicates the number of events, e.g., fire pixels, that occurred in the satellite imagery on a single day, e.g., Jul. 5, 2019, with respect to the known average rate of fire pixels occurring over one year, e.g., Apr. 5, 2018 to Apr. 5, 2019, as determined from the baseline distribution.

In some implementations, the calculated probability can correspond to a metric that is a proxy for the probability that the satellite image is not on fire. Given the proxy, the image server system 102 can determine whether the satellite image illustrates wildfire depending on a side of the threshold the likelihood falls. If the likelihood is greater, then the likelihood can indicate the satellite image illustrates wildfire. Alternatively, if the likelihood is smaller, then the likelihood can indicate the satellite image does not illustrate wildfire.

The image server system 102 can then compare the output probability to a threshold value to determine whether the satellite imagery of Jul. 5, 2019 has a similar number of fire pixels to the baseline distribution. For example, the image server system 102 may set the threshold value to 5% or 0.05. If the image server system 102 determines that the output probability is less than the threshold value, then the image server system 102 can determine that the satellite image likely illustrates fire. Alternatively, if the image server system 102 determines that the output probability is greater than the threshold value, then the image server system 102 can determine that the satellite image does not include fire.

If the image server system 102 determines that the output probability is less than the threshold value, then the image server system 102 repeats the process of comparing the average number of pixels that appear to illustrate wildfire to the previous day. For example, the image server system 102 can obtain the satellite imagery of Jul. 4, 2019 from the satellite imagery 114. Then, the image server system 102 can determine a number of pixels in the satellite imagery of Jul. 4, 2019 that appear to illustrate wildfire with a fire detection algorithm, for example. The image server system 102 can determine a probability from the statistical distribution based on the count of fire pixels that day. Then, the image server system 102 can compare the probability from the statistical distribution to a threshold value to determine whether the satellite image includes a likelihood of fire.

The image server system 102 repeats this process until the probability from the statistical distribution is greater than the threshold value. In some implementations, if the image server system 102 determines the probability for satellite imagery on a particular day to illustrate wildfire is greater than the threshold value, then the image server system 102 can deem that this satellite imagery has no fire. In this case, the image server system 102 can identify a first occurrence of satellite imagery that produces a probability based on the statistical distribution and the count of pixels that is greater than the threshold. In some implementations, the image server system 102 can deem that date to be the date the wildfire originated. As illustrated in system 100, this start date 118 or date the wildfire originated corresponds to Jun. 1, 2019 because the satellite imagery illustrates no ongoing wildfire, whereas the satellite imagery of Jun. 2, 2019, Jul. 4, 2019, and Jul. 5, 2019 do illustrate fire.

In other implementations, the image server system 102 can perform an additional process once the statistical distribution outputs a probability greater than the threshold for an identified date. In particular, the image server system 102 can perform a verification that the identified date that the wildfire originated is in fact correct, and not determined from an error. For example, the image server system 102 can determine that the identified date that the wildfire originated was not determined by noise, such as by clouds or by smoke found in the satellite imagery. To verify, the image server system 102 can calculate a probability using the statistical distribution 116 for each day one week prior to the identified start date.

For example, if the image server system 102 determines Jun. 1, 2019 as the identified date, then the image server system 102 can perform an additional verification process of calculating a probability using the statistical distribution 116 for each day prior to Jun. 1, 2019, e.g., each day back to May 25, 2019. The image server system 102 can obtain satellite imagery from each day between May 25, 2019 to May 31, 2019, for example, and count the number of fire pixels on each day between May 25, 2019 to May 31, 2019. Then, for the pixel count from each day, the image server system 102 can calculate a corresponding probability using the statistical distribution 116 from each day. If each corresponding probability is greater than the threshold, e.g., illustrates probabilities high enough to be classified as a no-fire day, then the image server system 102 can deem the day of Jun. 1, 2019 as the true date the wildfire originated. If not, and one of the days in the prior week period does illustrate a probability lower than the threshold, e.g., one of the days illustrates wildfire, then the image server system 102 can continue iterating backwards to find the actual start date of the wildfire and subsequently, an entire previous week of "no-fire" days. The same process holds true for finding the end dates of wildfire.

In some implementations, the image server system 102 may need to add an adjustment to the identified start date or the end date. For example, the image server system 102 may determine that the satellite cannot identify wildfire until two days after the start date. To fix the issue, the image server system 102 can subtract two days from the identified start date to ensure accurate temporal range detection. For example, if the image server system 102 identifies Jun. 1, 2019 as the start date, then the image server system 102 can move the date back two days, e.g., May 30, 2019, to account for inconsistent detections with the satellite. Other days, such as three, four, or five days, may also be possible.

In some implementations, the image server system 102 can adjust the identified start day based on a rate of change in an intensity of the fire. For example, if the image server system 102 noticed the satellite imagery changed by an intensity of 60 between one day to the next, the image server system 102 can move the date back by three days, e.g., May 29, 2019. If the image server system 102 noticed the satellite imagery changed by an intensity of 40 between one day to the next, the image server system 102 can move the date back by four days, e.g., May 28, 2019. Typically, fires that grow quickly require less adjustment than those fires that spread slowly. This process is similar for adjusting the identified end date.

During stage (F), the image server system 102 can generate the second statistical distribution using the start date 118 of the wildfire. As shown from system 100, the start date 118 of the wildfire occurred one month and four days before the provided input date 110. The image server system 102 can determine the end date 124 of the wildfire based on the second generated statistical distribution.

First, the image server system 102 can provide the start date 118 and the location 112 to the satellite images database 104 to obtain satellite imagery for generating the second statistical distribution. Stage (F) is similar to stage (C) in that a date and location are provided to the satellite images database 104, and the satellite images database 104 returns satellite imagery illustrating the location. However, in stage (F), the image server system 102 can also indicate to the satellite images database 104 to provide satellite imagery from both before the start date 118 and after the start date 118. The image server system 102 can generate the second statistical distribution based on the satellite imagery from before the start date 118 and can determine the end date 124 of the wildfire based on a comparison of the satellite imagery after the start date 118 to the second statistical distribution.

For example, the image server system 102 can indicate to the satellite images database 104 a time period around the start date 118 for obtaining satellite imagery. The time period around the start date 118 can be determined based on amount of time necessary to build the second statistical distribution, e.g., time period before the start date 118, and an amount of time necessary to identify the end date, e.g., time period after the start date 118. For example, the image server system 102 can identify a time period of one year and three months—one year prior to the start date 118 for building the second statistical distribution and three months after the start date 118 for satellite imagery to determine the end date 124. In other examples, the image server system 102 can request a large amount of satellite imagery, such as 2 years, 5 years, or more, centered on the start date 118.

During stage (G), the satellite images database 104 can provide the identified satellite imagery **120*a* and 120*b* to the image server system 102 over the network. The satellite images database 104 can provide the satellite imagery 120*a* and 120*b* over the network in an email, a zip file, or in another format. In some examples, the satellite images database 104 may transmit indices to image server system 102 to retrieve the satellite imagery 120*a* and 120*b***.

For example, the satellite imagery **120*a* can correspond to the satellite imagery obtained prior to the start date 118. The satellite imagery 120*b* can correspond to the satellite imagery obtained after the start date 118. The image server system 102 can generate the second statistical distribution based on the satellite imagery 120*a*. Additionally, the image server system 102 can determine the end date 124 based on the generated second statistical distribution and the satellite imagery 120*b***.

During stage (H), the image server system 102 can generate the second statistical distribution based on the identified satellite imagery **120*a* and the determined start date 118. Stage (H) is similar to stage (D). However, during stage (H), the image server system 102 is not required to determine the date three months prior to the input date because the start date 118 is known. In this case, the image server system 102 can identify a time region from before the start date 118**.

In some implementations, the image server system 102 can return an error, the identified temporal range, or both. The image server system 102 may return the error if an end date is requested for a wildfire that is still currently in progress, if satellite imagery is unavailable or low quality in the time and geographical location of the historical fire, satellite data is unavailable or low quality in the time ranges used to build the noise distributions, or others, to name a few examples. The error can indicate, for example, "insufficient satellite imagery", "wildfire still in progress", or "low quality satellite imagery". In other examples, the image server system 102 can indicate that if the baseline distribution is too close to a current day, e.g., such as within a day, a few days, or a week, then the image server system 102 can move the baseline distribution to an earlier time period, accordingly.

For example, the image server system 102 can generate a time range of one year before the start date 118. In this example, the image server system 102 can generate a time range from Jun. 1, 2018 to Jun. 1, 2019 for obtaining satellite imagery to build the second statistical distribution. As done in stage (C), the image server system 102 can ensure wildfire is not active in the satellite imagery between this time range. If the image server system 102 detects there is wildfire ongoing in this satellite imagery, e.g., or within the polygon of the satellite imagery, the image server system 102 can adjust the time range accordingly to avoid satellite imagery illustrating active wildfire.

In some implementations, the image server system 102 can generate the second statistical distribution 122 once a time range has been identified. In particular, the image server system 102 can generate the second statistical distribution 122 based on a subset of satellite imagery 120*a* that matches to the criteria of the identified time range, e.g., Jun. 1, 2018 to Jun. 1, 2019. The second statistical distribution 122 can also be in the form of a Poisson distribution, a Normal distribution, or a Gaussian distribution, to name a few examples. In some cases, the value λ for the second statistical distribution 122 may be different from the value λ for the first statistical distribution 116.

During stage (I), the image server system 102 can determine the end date 124 of the wildfire based on the generated second statistical distribution 122 and the satellite imagery 120*b*. The functionality of stage (I) is similar to the functionality of stage (E). However, the image server system 102 compares each of the satellite imagery from satellite imagery 120*b*, starting with the starting date of Jun. 1, 2019, to the generated second statistical distribution 122.

For example, the image server system 102 can obtain the satellite imagery of Jun. 1, 2019 from the satellite imagery 120*a*. Then, the image server system 102 can determine a number of pixels in the satellite imagery of Jun. 1, 2019 that appear to illustrate wildfire by counting each of the pixels that appear to illustrate wildfire. For example, the image server system 102 can identify a number of pixels within the polygon region of the satellite imagery of Jun. 1, 2019 that appear to illustrate wildfire. The image server system 102 can determine a probability from the second statistical distribution 122 based on the count of fire pixels in the image. Then, the image server system 102 can compare the probability from the statistical distribution to a threshold value to determine whether the satellite image includes a likelihood of fire.

If the image server system 102 determines that the probability for satellite imagery on a particular day, e.g., Jun. 2, 2019, to illustrate wildfire is less than the threshold value, then the image server system 102 can deem that this satellite imagery does appear to illustrate fire. In this case, the image server system 102 identifies the satellite imagery for the next day in the future from the satellite imagery 120*b*, e.g., satellite imagery for Jun. 3, 2019. The image server system 102 can traverse forward in time to find the end date of the wildfire. In particular, the image server system 102 repeats this process until the probability from the statistical distribution is greater than the threshold value and the probabilities for some number of consecutive days immediately after the potential end date are also greater than the threshold value. This number of days may be 6, 7, 8 or some other number, to name a few examples. This process for verifying that the potential end date of the wildfire is in fact correct is similar to the verification that the earlier potential state date of the wildfire is correct. However, instead of calculating a probability using the statistical distribution 116 for each day one week prior to the potential start date, the image server system 102, in this process, calculates a probability using the statistical distribution 122 for each day one week following the potential end date to identify "no-fire" days. The image server system 102 can continue iterating forwards to identify the actual end date of the wild fire if the following one week period yields one or more days illustrating wildfire.

In some implementations, if the image server system 102 determines the probability for satellite imagery on a particular day to illustrate wildfire is greater than the threshold value, then the image server system 102 can deem that this satellite imagery has no fire. Then, the image server system 102 can repeat the process of calculating a probability for a number of consecutive days following the potential day, e.g., such as a week, using the statistical distribution to identify whether the potential day corresponds to the actual end date. If the image server system 102 determines the generated probability for each day following the potential date is greater than the threshold, then the image server system 102 can deem that date to be the date the wildfire ended.

In some implementations, the image server system 102 may determine the end date 124 of the wildfire by analyzing pixels within the one or more burned regions that were recently on fire and the one or more scarred regions that resulted from fires. The image server system 102 can determine that these corresponding pixels within the polygon of the satellite imagery correspond to burned or scarred regions. Additionally, the image server system 102 can expand the polygon region overlaid on the satellite imagery when identifying the end date 124. By expanding, the image server system 102 can identify pixels within the largest perimeter of the polygon to ensure the wildfire has not spread to other regions within the satellite imagery.

In some implementations, the image server system 102 can include multiple perimeter polygons in the satellite imagery over the course of the wildfire's lifespan. In this case, the image server system 102 can crop the closest polygon after the input date 110 to the satellite data when building the statistical distribution 116. Additionally, the image server system 102 can crop the oldest polygon when building the statistical distribution 122. The image server system 102 can select the closest polygon for the statistical distribution 116 and the oldest polygon for the statistical distribution 122 to reduce noise when determining the start date. If the image server system 102 views satellite imagery in areas that are known to not have burned as a result of the wildfire during a particular day, the image server system 102 will only count noisy pixels that do not include wildfire. As such, the image server system 102 only counting fire pixels will decrease the accuracy of the start date predictions.

As illustrated in system 100, the satellite imagery of Jun. 1, 2019 appears to illustrate wildfire, the satellite imagery of Jun. 2, 2019 appears to illustrate wildfire, the satellite imagery of Aug. 4, 2019 appears to illustrate wildfire albeit smaller, and the satellite imagery of Aug. 5, 2019 does not appear to illustrate wildfire. Assuming the image server system 102 does not detect wildfire on a number of days following Aug. 5, 2019, e.g., Aug. 6, 2019 to Aug. 13, 2019, the image server system 102 can define the end date 124 or date the wildfire ended to be Aug. 5, 2019.

During stage (J), the image server system 102 can provide the output temporal range of the wildfire to one or more pipelines. As illustrated in system 100, the image server system 102 determined the temporal range of the wildfire to be Jun. 1, 2019 to Aug. 5, 2019 based on the first statistical distribution 116, the second statistical distribution 122, and corresponding satellite imagery. Moreover, the image server system 102 can determine this temporal range to be accurate because the length of the temporal range is less than three months, e.g., maximum amount of time fires last, and the input date 110 falls within the temporal range.

In some implementations, the image server system 102 can provide the temporal range to one or more internal or external pipelines. The internal pipelines can be, for example, different machine learning models as training data. The different machine learning models can perform applications, such as, monitoring wildfires and their spread. Other internal pipelines can include, for example, different graphical representations of wildfires, or other user interfaces to indicate a spread of a wildfire. The external pipelines can be, for example, other external systems that perform wildfire detection, dispatching responders for extinguishing wildfires, and remotely monitoring crises, such as with wildfires or other climate disasters. The image server system 102 can also provide the temporal range for the wildfire to other systems. For example, as illustrated in system 100, the image server system 102 can output the temporal range to a monitor 126 for review.

The image server system 102 can obtain satellite imagery from the satellite images database 104 with known starting and ending dates to verify the authenticity of the process of system 100. For example, the image server system 102 can obtain multiple satellite images corresponding to middle dates of an identified time range. Then, the image server system 102 can provide each satellite image, from the multiple satellite images, to the process shown in system 100 to determine if the image server system 102 can identify the same temporal range, e.g., start and end dates. If the image server system 102 can identify the same temporal range with each satellite image, then the process shown in system 100 appears to be functioning properly.

Figure 2A:
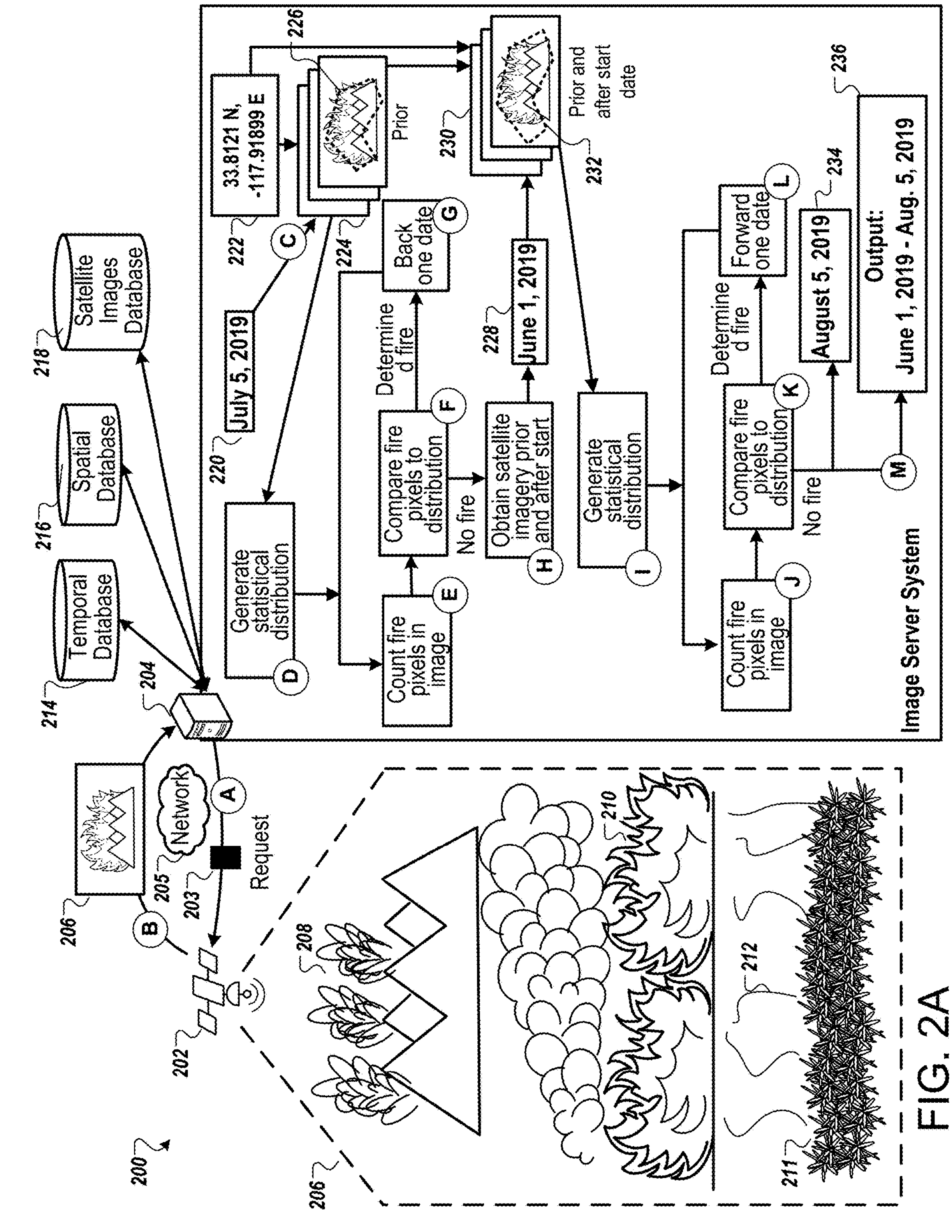
FIG. 2A is a block diagram that illustrates an example of a system for receiving satellite imagery and generating a temporal range of a wildfire from the satellite imagery.

FIG. 2A is a block diagram that illustrates an example of a system 200 for receiving satellite imagery and generating a temporal range of a wildfire from the satellite imagery. System 200 includes similar components and performs similar functionality to system 100. For example, system 200 includes a satellite 202, an image server system 204, a temporal database 214, a spatial database 216, and a satellite images database 218. System 200 also includes a network 205, which may include either a satellite network, a local connection, or another connection over the Internet.

During stage (A), the image server system 204 may transmit a request 203 to the satellite 202 over the network 205. The request 203 can indicate to the satellite 202 to capture one or more satellite images of a geographic region on the Earth. The request 203 may include locational coordinates, e.g., latitude and longitudinal coordinate, of an area to capture one or more images as the satellite 202 navigates around the Earth.

During stage (B), the satellite 202 can capture one or more satellite images of the geographic region provided by the request 203. The satellite 202 may include one or more satellite cameras for capturing satellite imagery. For example, as illustrated in system 200, the geographic region can include one or more mountains, hills, fire, and smoke. Other geographical regions can include more, less, or different geographical features than those shown in system 200. The satellite 202 can capture satellite imagery 206 of the requested geographical region as the satellite 202 navigates the Earth.

For example, the satellite 202 may navigate over the requested geographic region on a daily basis, and as such, be able to provide satellite imagery of the requested geographic region on a day-to-day basis. In some implementations, the satellite 202 may capture the geographic region in multiple images, multiple videos, or both per day. In this case, the image server system 102 may be able to view multiple satellite images and videos on one day, a different set of multiple satellite images and videos on the next day, and so on. By providing sets of media, the image server system 204 can increase the accuracy of its temporal range wildfire detection.

In some implementations, the one or more geographic regions captured by a satellite camera can include one or more locations associated with wildfire. For example, the one or more locations associated with the wildfire can include one or more regions that have not been on fire, one or more regions that are actively on fire, one or more burned regions that were recently on fire, and one or more scarred regions that resulted from fires. As illustrated in system 201, the one or more locations associated with wildfire in the geographic region can include one or more regions that have not been on fire 211, one or more regions that are actively on fire 210, one or more burned regions that were recently on fire 208, and one or more scarred regions that resulted from fires 212.

Each of the regions 208, 210, 211, and 212 can be adjacent to one another in the geographic region. The satellite imagery may include one or more of these regions when the satellite 202 captures one or more images of the geographic region based on the location in the request 203. For example, the satellite 202 may capture an image that includes the location from the request 203, and the image can include the region that is actively on fire 210, the burned regions that were recently on fire 208, and one or more scarred regions that resulted from fires 212. Other satellite images may include other regions, such as each of the regions illustrated in system 100.

Then, the satellite 202 can transmit the captured media 206 to the image server system 204 over the network 205. In some implementations, the satellite 202 may transmit the captured media 206 directly to the satellite images database 218 and directly bypass the image server system 204. In this case, at a later point in time, the image server system 204 can obtain data identifying the captured media 206 to determine a temporal range of the wildfire illustrated by captured media. For example, the data identifying the captured media 206 can include, for example, locational data and a particular time when the wildfire illustrated by the captured media 206 was active.

During stage (C), the image server system 204 obtains an input date 220 of a wildfire and a corresponding location 222 of the wildfire. Stage (C) in system 200 is similar to stages (A), (B), and (C) of system 100. In particular, and as illustrated in system 200, the image server system 204 obtains the input date 220 of Jul. 5, 2019 and a location 222 of 33.8121 N,−117.91899 E for a corresponding wildfire. In some implementations, the image server system 204 can obtain polygons to apply to the satellite imagery to reduce the amount of pixels to be searched. The polygons can be obtained from the spatial database 216. The polygons can spatially restrict the number of pixels searched for by the image server system 102 for fire pixels. For example, the image server system 204 can apply polygon 226 to the obtained satellite imagery 224. The corresponding wildfire may correspond to the wildfire captured in the satellite imagery 206, but may instead refer to previously captured satellite imagery and stored in the satellite images database 218.

The image server system 204 can provide the date 220 when the wildfire occurred and the location 222 where the wildfire occurred to the satellite images database 218. Additionally, the image server system 204 can indicate a time period for satellite imagery retrieval. For example, the image server system 204 may indicate to the satellite images database 218 to provide all satellite imagery starting from the Jul. 5, 2019 date and two years prior that illustrates the location 222. The image server system 204 can also request satellite imagery from the satellite images database 218 with different time periods, such as one year, three year, five years, or more, to name a few examples. In response, the satellite images database 218 can return the satellite imagery 224 based on the criteria specified by the image server system 204 to the image server system 204. Then, the image server system 204 can apply the polygon 226 to the obtained satellite imagery 224 for spatially restricting the region the image server system 204 searches for fire pixels.

During stage (D), the image server system 204 can generate a first statistical distribution based on the obtained satellite imagery 224. Stage (D) of system 200 is similar to stage (D) of system 100.

In particular, the image server system 204 can determine a time range to identify a subset of satellite imagery from the satellite imagery 224. The image server system 204 identifies a date three months prior to the input date 220, e.g., Apr. 5, 2019. Then, the image server system 204 determines either a one-year time range, e.g., Apr. 5, 2018 to Apr. 5, 2019, or a nine-month time range, e.g., Jul. 5, 2019 to Apr. 5, 2019, to build the satellite imagery baseline.

In response to identifying the time range, the image server system 204 can identify the subset of satellite imagery from the satellite imagery 224 using the identified time range. For example, the image server system 204 can identify satellite imagery from the satellite imagery 224 from Apr. 5, 2018 to Apr. 5, 2019 and ensure this identified satellite imagery does not illustrate wildfire pixels, e.g., does not illustrate satellite imagery within a threshold. The image server system 204 can then generate the first statistical distribution by determining the average number of fire pixels found in the identified satellite imagery within the time range, and fitting the average number of fire pixels to a statistical distribution. The statistical distribution may be, for example, a Poisson distribution where the mean is equivalent to the variance.

During stage (E), the image server system 204 can determine a number of pixels in the satellite imagery that appear to illustrate active wildfire from the satellite imagery 224. Stage (E) in system 200 is similar to stage (E) in system 100. In particular, the image server system 204 can determine the number of pixels within a polygon in the satellite imagery that appear to illustrate wildfire for a particular day, e.g., Jul. 5, 2019, by counting the detected fire pixels using a fire detection algorithm or using a brightness threshold detection, to name a few examples.

During stage (F), the image server system 204 can compare the number of detected fire pixels to the generated statistical distribution. Stage (F) in system 200 is similar to stage (E) in system 100. For example, in the case the generated statistical distribution is a Poisson distribution, the image server system 204 can determine a probability by providing the number of detected fire pixels for the particular image as a value in the Poisson distribution. The Poisson distribution can return a probability that indicates the likelihood of an event occurring, e.g., the likelihood that the particular image on Jul. 5, 2019 illustrates wildfire. The image server system 204 can compare the probability to a threshold to determine whether the satellite imagery of the particular day has a similar number of fire pixels.

If the image server system 204 determines that the probability output by the generated statistical distribution is less than the threshold, then during stage (G), the image server system 204 obtains satellite imagery for a previous day. Stage (G) in system 200 is similar to stage (E) in system 100. For example, the image server system 204 obtains satellite imagery for Jul. 4, 2019 and repeats the processes for stages (E) and (F) of system 200. The image server system 204 repeats the processes for stages (E), (F), and (G) until the start date of the wild fire has been identified. Thus, the image server system 204 will continue to move back one date at a time until the corresponding satellite imagery illustrating the location 222 does not illustrate active or ongoing wildfire, e.g., probability output by generated statistical distribution is greater than the threshold value.

Alternatively, if the image server system 204 determines that the probability output by the generated statistical distribution is greater than the threshold, then during stage (H), the image server system 204 indicates that the start date 228 of the wildfire has been identified, assuming the image server system 204 does not detect wildfire on a predetermined number of days prior to the potential start date 228. As illustrated in system 200, the start date 228 of the wildfire corresponds to Jun. 1, 2019. Stage (H) in system 200 is similar to stages (F) and (G) of system 100.

For example, during stage (H), the image server system 204 can provide the identified start date 220 and the location 222 to the satellite images database 218 to obtain satellite imagery for generating the second statistical distribution. Here, the image server system 204 also can indicate to the satellite images database 218 to provide satellite imagery from both before and after the start date 228. For example, the image server system 204 can specify a particular time frame around the start date 228, such as 1 year and 3 months, or request a large time frame around the start date 228, such as two years, five years, or more.

In some implementations, the satellite images database 218 can return the obtained satellite imagery 232 based on the criteria identified by the image server system 204. In particular, the satellite imagery 232 can include satellite imagery from before the identified start date 228, e.g., for building the second statistical distribution, and satellite imagery from after the identified start date 228, e.g., for identifying the end date of the wildfire.

During stage (I), the image server system 204 can generate the second statistical distribution based on the satellite imagery 232 from before the identified start date 228 and the identified start date 228. Stage (I) of system 200 is similar to stage (H) of system 100. In this stage, the image server system 204 can identify a time range prior to the start date 228 for building the second statistical distribution. The image server system 204 can extract a subset of satellite imagery from the satellite imagery 232 based on the identified time range. Then, the image server system 204 can fit the subset of satellite imagery to a statistical distribution, such as a Poisson distribution, a Normal distribution, or a Gaussian distribution.

During stage (J), the image server system 204 can determine a number of pixels in the satellite imagery that appear to illustrate wildfire from the satellite imagery 232 after the start date 228. Stage (J) in system 200 is similar to stage (I)

in system 100. In this case, the image server system 204 can count the number of pixels in the satellite imagery that appear to illustrate wildfire for a particular day, e.g., Jun. 1, 2019, by determining each pixel's brightness or using a fire detection algorithm.

During stage (K), the image server system 204 can compare the count of fire pixels for a particular image on a particular day to the generated second statistical distribution. Stage (K) in system 200 is similar to stage (F) in system 200. The generated second statistical distribution can produce a probability that indicates the likelihood of an event occurring, e.g., the likelihood that the particular image on Jun. 1, 2019 illustrates wildfire. The image server system 204 can compare the probability to a threshold to determine whether the satellite imagery of the particular day has a similar number of fire pixels.

If the image server system 204 determines that the probability output by the generated second statistical distribution is less than the threshold, then during stage (L), the image server system 204 obtains satellite imagery for the next day. Stage (L) in system 200 is similar to stage (I) in system 100. For example, the image server system 204 obtains satellite imagery for Jun. 2, 2019 and repeats the processes for stages (J) and (K) of system 200. The image server system 204 repeats the processes for stages (J), (K), and (L), moving forward one date at a time, until the end date of the wildfire has been identified and assuming the image server system 204 does not detect wildfire on a predetermined number of days following the potential end date.

Alternatively, if the image server system 204 determines that the probability output by the generated statistical distribution is greater than the threshold, then during stage (K), the image server system 204 indicates that the end date 234 of the wildfire has been identified, assuming the image server system 204 does not detect wildfire on a predetermined number of days following the potential end date 234. As illustrated in system 200, the end date 234 of the wildfire corresponds to Aug. 5, 2019. Stage (K) in system 200 is similar to stages (I) of system 100.

During stage (M), the image server system 204 provides for output the temporal range 236 of the wildfire. The temporal range 236 illustrates the range of the wildfire to be from Jun. 1, 2019 to Aug. 5, 2019. Stage (M) of system 200 is similar to stage (J) of system 100. For example, the image server system 204 can output the temporal range 236 to one or more external or internal pipelines.

Figure 2B:
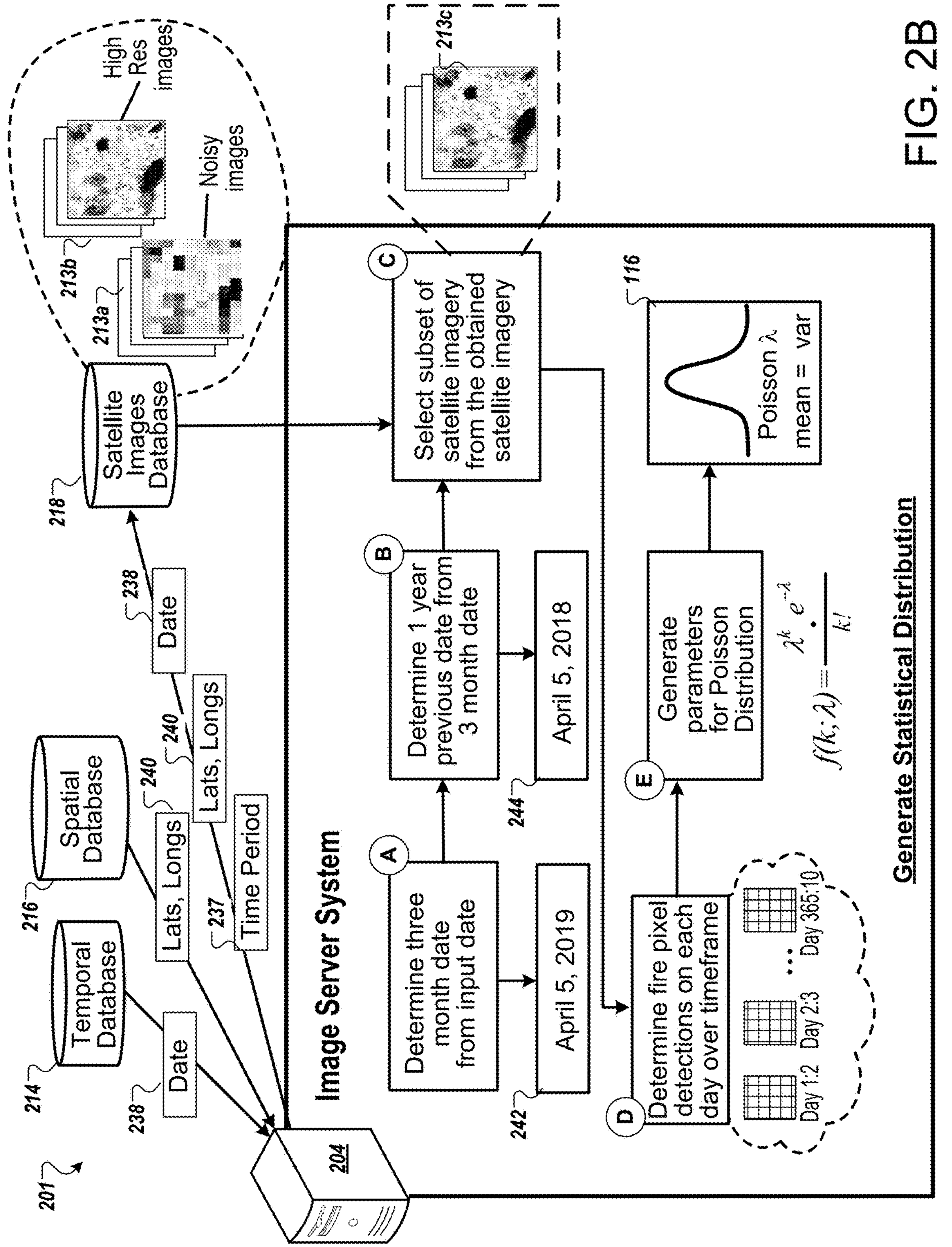
FIG. 2B is a block diagram that illustrates an example of a system for generating a statistical distribution when determining a temporal range of a wildfire.

FIG. 2B is a block diagram that illustrates an example of a system 201 for generating a statistical distribution when determining a temporal range of a wildfire. The system 201 illustrates the processes performed during stages (D) and (H) from system 100 and stages (D) and (I) from system 200. Moreover, the system 201 and its processes may also be performed by the image server system 102.

In some implementations, the system 201 illustrates the processes for generating the statistical distribution. The image server system 204 can generate the statistical distribution to be a Poisson distribution, a Normal distribution, or a Gaussian distribution, to name a few examples. The process for generating the statistical distribution generally includes, among other things: (i) identify a first date that is three months prior to the input date; (ii) identify a second date that is one year or nine-months prior to the first date; (iii) select a subset of satellite imagery from the obtained satellite imagery based on the time range between the first and second date; (iv) determine a mean, a standard deviation, and other statistical characteristics of fire pixels from the subset of satellite imagery; and, (v) generate the statistical distribution based on the statistical characteristics of fire pixels from the subset of satellite imagery.

In some implementations, the image server system 204 can generate the statistical distribution without identifying the first date that is three months prior to the input date. In this case, if the image server system 204 determines the input date corresponds to the actual start date of the wildfire, such as the start date 118 produced in system 100, then the image server system 204 can proceed to identify the second date that is one year prior to the input date without identifying the first date. For example, if the input date is the determined start date of the wildfire, e.g., Jun. 1, 2019, then instead of identifying a date three months prior to Jun. 1, 2019 for ensuring no wildfire exists in the satellite imagery, the image server system 204 can identify the second date that is one year prior to the start date. This corresponds to a second date of Jun. 1, 2018.

Consequently, the image server system 204 can identify a time range of Jun. 1, 2018 to Jun. 1, 2019 instead of Mar. 1, 2018 to Mar. 1, 2019, e.g., if the image server system 204 were to move the start date back by three months. In some cases, the image server system 204 can identify a nine-month time range instead of a one-year time range, e.g., Sep. 1, 2019-Jun. 1, 2019. The image server system 204 can identify the nine-month range in the case that a shorter time range is required for memory constraints, to avoid detections of fire pixels in historical satellite imagery, or if an external user requests that specific time range, to name a few examples.

During stage (A), the image server system 204 can determine a first date 242 that is three months prior to the input date. For example, the image server system 204 can determine the first date 242 to be Apr. 5, 2019 in the case that the input date corresponds to the input date 110 of the wildfire, e.g., Jul. 5, 2019. In some cases, the image server system 204 skips this stage if the input date corresponds to the determined start date of the wildfire, e.g., start date 118.

During stage (B), the image server system 204 can determine a second date 244 that is one year prior to the first date 242. For example, the image server system 204 can determine the second date 244 to be Apr. 5, 2018 in the case that the first date 242 corresponds to Apr. 5, 2019 and the input date corresponds to the input date 110 of the wildfire. However, in this example, the image server system 204 can determine the first date 242 to be Jun. 1, 2018 if the input date is the start date 118.

During stage (C), the image server system 204 can select a subset of satellite imagery from the obtained satellite imagery. As illustrated in system 201, the image server system 204 can obtain a location 240 of a geographic region where a wildfire occurred and a date 238 when the wildfire occurred at the location 240. The date can be, for example, a string indicating Jul. 5, 2019 and the location can be a string or numbers indicating latitude and longitudinal coordinates of 33.8121 N,−117.91899 E. This stage is similar to stages (A) and (B) from system 100.

Then, the image server system 204 can request satellite imagery from the satellite images database 218 by providing the date 238, the location 240, and a time period 237. The time period 237 can indicate, for example, a period of time prior to the date 238 for obtaining satellite imagery. For example, the time period 237 may indicate a period of time of 1 year, 3 years, 5 years, or another length of time sufficient to build a statistical distribution.

In some implementations, the image server system 204 can indicate that the time period 237 corresponds to a period of time before the date 228 and a period of time after the date 238. For example, if the image server system 204 is seeking to determine the end date of the wildfire, the image server system 204 can indicate to the satellite images database 218 to identify two years prior to the date 238 and 5 months after the date 238. Other periods of time may also be indicated.

The satellite images database 218 can include satellite images that illustrate various geographic regions of the Earth. For example, the satellite images may include high-resolution images 213*b*, noisy images 213*a*, and other types of images, such as infrared video and other media.

In some implementations, the image server system 204 can obtain the satellite imagery and select a subset of satellite imagery from the obtained satellite imagery. For example, as illustrated in system 201, the image server system 204 can select the satellite imagery 213*c* from the obtained satellite imagery. The satellite imagery 213*c* can include set of satellite imagery showing high resolution images, noisy resolution images, low resolution images, satellite video, and other satellite media. The image server system 204 can select the satellite imagery 213*c* based on an time period identified in stages (A) and (B) of system 201, one or more time ranges that avoid fire pixel detection in the set of satellite imagery, and other criteria.

During stage (D), the image server system 204 can determine fire pixel detections on each day over the identified time range. This stage is similar to stage (D) from system 100. For example, the image server system 204 can analyze each satellite imagery from the satellite imagery 213*c* and determine a number of pixels on each day in the set of satellite imagery that appear to illustrate wildfire. For example, the image server system 102 can analyze the satellite imagery 113*c* on each day between the identified time range of Apr. 5, 2018 to Apr. 5, 2019 and determine a number of fire pixels on each day. In another example, the image server system 102 can analyze within the polygon of the satellite imagery 113*c* between each day of Apr. 5, 2018 to Apr. 5, 2019 and determine a number of fire pixels on each day within the polygon. The image server system 102 may count two fire pixels on Apr. 5, 2018, three fire pixels on April 6, and continue counting satellite imagery for each day until Apr. 5, 2019, for example.

During stage (E), in response to determining the number of fire pixels for each day in the satellite imagery 113*c*, the image server system 204 can generate the statistical distribution. For example, the image server system 204 can generate the one or more parameters for the statistical distribution, which may be a Poisson distribution, such as the mean and the variance of the distribution. In the case the statistical distribution is a Poisson distribution, the image server system 204 can determine an average number of pixels from the set of satellite imagery 113*c* that appear to illustrate fire. In this case, the average number of pixels identified that appear to illustrate wildfire over the identified time range may be five, for example, and this value is equivalent to the variance of the Poisson distribution. In response to identifying the average and fitting the mean of the fire pixel detection in the satellite imagery, the image server system 204 can provide the statistical distribution 116 for various applications.

Figure 3:
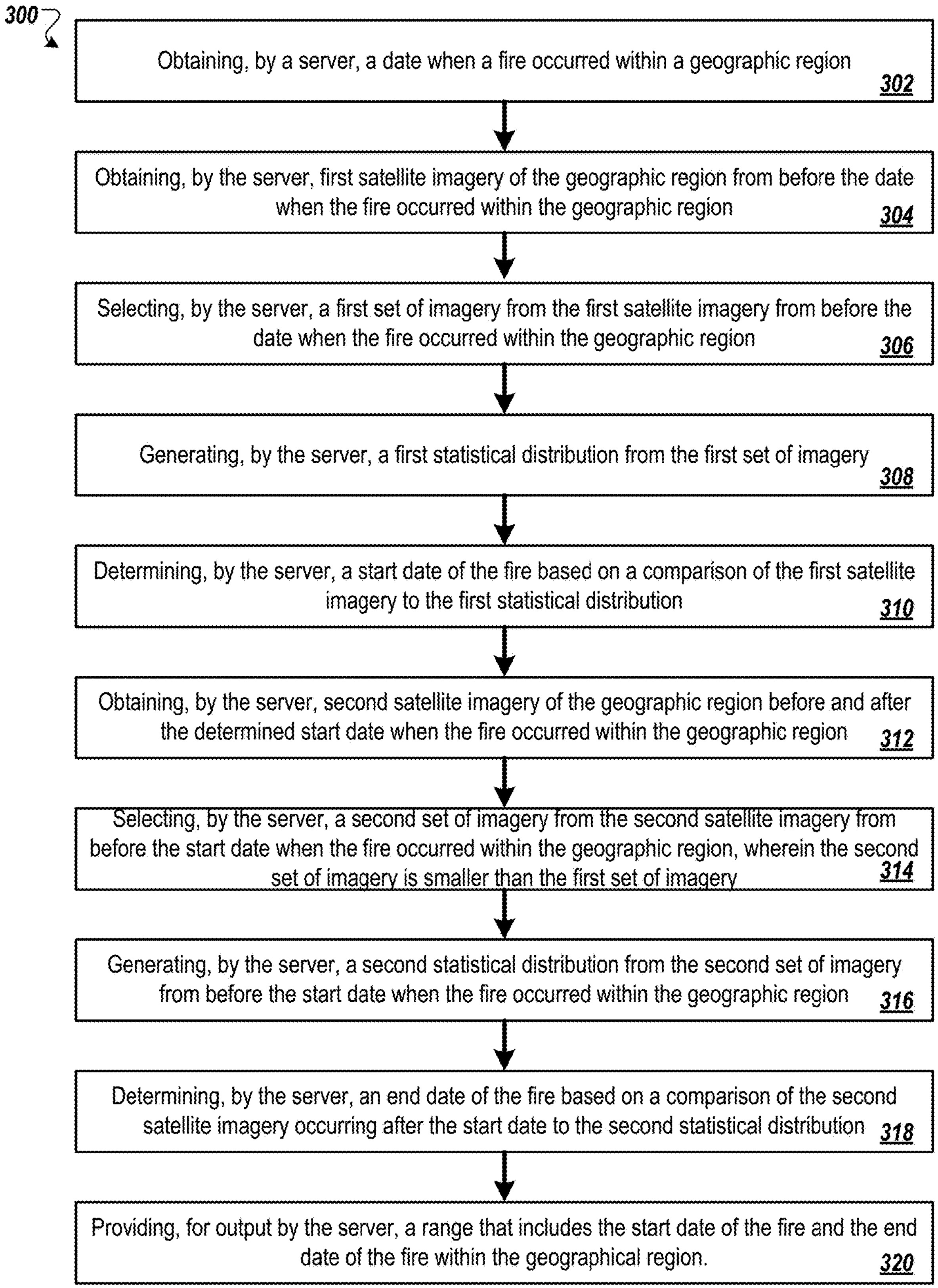
FIG. 3 is a flow diagram that illustrates an example of a process for generating a temporal range of a wildfire.

FIG. 3 is a flow diagram that illustrates an example of a process 300 for generating a temporal range of a wildfire. The image server system 102 of system 100 and image server system 204 of system 200 can perform the process 300.

The image server system obtains a date when a fire occurred within a geographic region (302). For example, an external database, such as a temporal database, may provide the date, which indicates a day in which wildfire occurred at a geographic region, to the image server system. The date can be provided in month, day, year format, or another format. The date can correspond to the start date of the wildfire, the end date of the wildfire, or another date in between the start date and the end date of the wildfire.

In some implementations, the image server system can also obtain a location that describes the location where the wildfire occurred based on the date. For example, the location can include locational GPS coordinates, names of landmarks, names of cities, name of other geographical regions, specific addresses, or other locations.

The image server system can also obtain a polygon that indicates a region in satellite imagery that encompasses the wildfire. The polygon can spatially restrict the number of pixels in the satellite imagery that the image server system can search over to identify fire pixels. In essence, the image server system can search for fire pixels in the satellite imagery within regions spatially defined by the polygon so as to reduce the processing and the amount of pixels the image server system needs to search over to identify fire pixels.

The image server system obtains first satellite imagery of the geographic region from before the date when the fire occurred within the geographic region (304). In some implementations, the image server system can provide the obtained location that describes the geographic region where the wildfire occurred and the obtained date when the wildfire occurred to a satellite images database. Additionally, the image server system can also provide a time range that indicates a time period prior to the input date for obtaining satellite imagery. The time period can include, for example, one year prior to the input date, two years prior to the input date, five years prior to the input date, or some other time period prior to the input date that is sufficient to build the statistical distribution.

The satellite images database can use the obtained date, obtained location, and the time range to identify satellite imagery that meet the provided criteria. The satellite imagery can include one or more satellite images, e.g., high quality, medium quality, low quality, full of noise, and other satellite imagery. The satellite imagery can illustrate one or more geographic regions of the Earth. In some implementations, the satellite images database can provide the identified satellite imagery that meets the criteria, to the image server system for building the statistical distribution.

The image server system selects a first set of imagery from the first satellite imagery from before the date when the fire occurred within the geographic region (306). In some implementations, the image server system can identify a first set of imagery from the first satellite imagery for building the statistical distribution. First, the image server system can identify a time period prior to the input date within the obtained satellite imagery that does not illustrate wildfire. The image server system can determine a date three months prior to the input date because generally, wildfires do not last longer than three months. By identifying a date that is three months prior to the input date, the image server system can safely assume that the same wildfire identified by the input date and the location is not active or has not been lit in the corresponding satellite imagery.

In some implementations, the image server system can determine a date one year prior to the date that is three months prior to the input date. For example, if the input date corresponds to Jul. 5, 2019, the image server system can determine the date three months prior to the input date to be Apr. 5, 2019. Next, the image server system identifies a date one year prior to the Apr. 5, 2019 date—this date corresponds to Apr. 5, 2018. In some implementations, the image server system can use a nine-month prior date instead of a one year date.

In some implementations, the image server system can identify the first set of satellite imagery from the first satellite imagery using the time range for building the statistical distribution. For example, the image server system identifies satellite imagery from the obtained satellite imagery from the satellite images database between Apr. 5, 2018 and Apr. 5, 2019 dates, inclusive.

However, for the image server system to use the first set of satellite imagery from Apr. 5, 2018 to Apr. 5, 2019, the image server system can ensure no historical fires exist in the identified satellite imagery during that time period. For example, the image server system can use an external database of historical fires to make this determination. If the external database of historical fires indicate no fires existed during this time, then the image server system can execute a fire detection algorithm on each satellite image within the time range of Apr. 5, 2018 to Apr. 5, 2019 to determine a number of pixels include fire from each image. If the number of fire pixels in a satellite image is less than the threshold value, then the image server system can indicate that the particular satellite image does not include fire. Alternatively, the image server system can adjust the time range if an image is found to include fire, e.g., number of fire pixels is greater than the threshold value.

The image server system generates a first statistical distribution from the first set of imagery (308). For generating the first statistical distribution, the image server system can generate one or more parameters for the statistical distribution. For instance, the image server system can determine a number of pixels on each day of the identified satellite imagery from (306) that appear to illustrate fire. The image server system can use a fire detection algorithm to count the number of fire pixels on each day. In some implementations, the image server system may crop polygons to each of the images in the identified satellite imagery before counting fire pixels to reduce the number of pixels that need to be analyzed. Then, the image server system can determine the mean or the average number of fire pixels from each image. The image server system may also determine other data descriptors such as, for example, standard deviation and variance to fit a particular statistical distribution.

For example, the image server system can fit the mean of the average number of fire pixels to a Poisson distribution. In a Poisson distribution, the mean is equivalent to the variances. Other distributions, such as Normal and Gaussian distributions, require the image server system performing different processes to determine data descriptors that aid in fitting the identified satellite imagery to the other distributions. Once the data has been fit to a Poisson distribution, for example, the image server system can process the obtained satellite imagery to identify the start date of the wildfire.

The image server system determines a start date of the fire based on a comparison of the first satellite imagery to the first statistical distribution (310). In some implementations, the generated statistical distribution can be used to indicate a probability that some event occurred from the baseline of the generated statistical distribution. For example, the probability density function of a Poisson distribution can return a probability that a particular day with k counted pixels occurred naturally from the distribution of noise. The lower the value output by the PDF, the more likely an external force, e.g., a wildfire, contributed to the count of the k value. Alternatively, the higher the value output by the PDF, the less likely an external force contributed to the count of the k value, and an indication that the image more closely resembles that from the baseline distribution.

The image server system can identify satellite imagery from the obtained satellite imagery a day prior to the date when the wildfire occurred. The image server system can count or determine a number of pixels in the satellite image from the prior day that appears to illustrate fire. In some cases, the number of pixels counted can be within a polygon region cropped by the image server system. Then, the image server system can provide the determined number of fire pixels for that image of that particular day as input to the generated statistical distribution.

The image server system can compare the output probability from the generated statistical distribution, e.g., Poisson distribution, to a threshold value. If the output probability is less than the threshold value, then the image server system can determine that the corresponding satellite image includes a likelihood of fire. Alternatively, if the output probability is greater than the threshold value, then the image server system can determine that the corresponding satellite image does not include fire. The image server system repeats this process if fire is determined and iterates backwards in time, e.g., Jul. 4, 2019 to Jul. 3, 2019, etc., until a satellite image is found that does not appear to illustrate wildfire.

In response to the image server system determining that a satellite image does not illustrate wildfire, the image server system obtains additional satellite imagery from the obtained satellite imagery for a predetermined number of days prior to the particular day. For example, if the image server system determined a potential start date of Jun. 1, 2019, then the image server system can identify 8 days prior to Jun. 1, 2019, e.g., May 24, 2019, and obtain satellite imagery for each of those days. The image server system seeks to identify and verify whether Jun. 1, 2019 is the actual start date, and analyzes a predetermined number of days prior to that potential start date to determine no fire exists in the satellite imagery corresponding to those days. If no fire exists in those days, then the image server system can claim with confidence that Jun. 1, 2019 is the actual start date of the fire.

First, the image server system can count a number of pixels that appear to illustrate fire on each day in the predetermined number of days prior to Jun. 1, 2019. Then, the image server system can generate a likelihood for each day using the statistical distribution and the number of pixels that appear to illustrate wildfire on each corresponding day. The statistical distribution can return a probability or likelihood for each day. For example, for May 31, 2019, the probability can be 0.56, for May 30, 2019, the probability can be 0.6, and for May 29, 2019, the probability can be 0.7. This process repeats until May 24, 2019, or repeats until each day in the predetermined number days has an associated probability. If each days' probability is greater than a threshold value, then the image server system can indicate with confidence that Jun. 1, 2019 is the actual start date of the fire. If one or more of the days' probability is less than a threshold, then the image server system can continue iterating backwards to find the actual start date of the wildfire and subsequently, an entire previous week of "no-fire" days.

The image server system obtains second satellite imagery of the geographic region before and after the determined start date when the fire occurred within the geographic region (312). The image server system can provide the obtained location and the identified start date to the satellite images database. Additionally, the image server system can also provide a time period around the identified start date for building the second statistical distribution, such as one year and three months—one year prior to the start date for building the second statistical distribution and three months after the start date for satellite imagery to determine the end date. The satellite images database can use the criteria to identify and return second satellite imagery that meets this criteria. (312) includes similar functionality as (304).

The image server system selects a second set of imagery from the second satellite imagery from before the start date when the fire occurred within the geographic region, wherein the second set of imagery is smaller than the first set of imagery (314). In some implementations, the image server system can identify a second set of imagery from the second satellite imagery for building the second statistical distribution. The image server system can identify a time period prior to the start date within the obtained satellite imagery that does not illustrate wildfire. The image server system is not required to determine a three months date prior to the start date because the day the fire originated is already known. Thus, the time period prior to the start date for the second satellite imagery can be smaller or less than the period identified for the first set of satellite imagery, which did include the three month prior period. Instead, the image server system can identify a date one year prior to the start date to build the second statistical distribution.

In some implementations, the image server system can identify the second set of satellite imagery from the second satellite imagery using the time range for building the second statistical distribution. For example, the image server system identifies satellite imagery from the obtained satellite imagery from the satellite images database between Jun. 1, 2018 and Jun. 1, 2019, inclusive. Additionally, the image server system can ensure that wildfire is not active in the second set of satellite imagery during the Jun. 1, 2018 to Jun. 1, 2019 time range. If wildfire is active, the image server system can adjust the time range. (314) includes similar functionality to (306).

The image server system generates a second statistical distribution from the second set of imagery from before the start date when the fire occurred within the geographic region (316). (316) includes similar functionality as (308). In particular, the image server system can generate one or more parameters for the second statistical distribution. For instance, the image server system can determine a number of pixels on each day of the identified satellite imagery from (314) that appear to illustrate fire. The image server count the number of fire pixels on each day using a fire detection algorithm and determine the average number of fire pixels from each image. The image server system may also determine other data descriptors such as, for example, standard deviation and variance to fit a particular statistical distribution, such as a Poisson distribution. Once the data has been fit to the second statistical distribution, such as Poisson, the image server system can process the obtained satellite imagery to identify the end date of the wildfire.

The image server system determines an end date of the fire based on a comparison of the second satellite imagery occurring after the start date to the second statistical distribution (318). (318) includes similar functionality as (310). In some implementations, the image server system can identify satellite imagery from the obtained satellite imagery a day after the start date. The image server can count the number of fire pixels in the identified satellite imagery and provide the determined number of fire pixels as input to the second statistical distribution. If the probability output from the second statistical distribution is less then a threshold value, then the image server system can determine that the corresponding satellite image includes a likelihood of fire. Alternatively, if the output probability is greater than the threshold value, then the image server system can determine that the corresponding satellite image does not include fire. The image server system repeats this process and iterates forward one day at a time, e.g., Jun. 1, 2019 to Jun. 2, 2019 to Jun. 3, 2019, etc., until a satellite is found that does not appear to illustrate wildfire.

In response to detecting a date as a potential end date, e.g., Aug. 5, 2019, the image server system can obtains additional satellite imagery from the obtained satellite imagery for a predetermined number of days after the potential end date. Here, the image server system seeks to identify and verify whether Aug. 5, 2019 is the actual end date, and analyzes a predetermined number of days after the potential end date to determine no fire exists in the satellite imagery corresponding to those days. If no fire exists in those days, then the image server system can claim with confidence that Aug. 5, 2019 is the actual end date of the wildfire.

Similar to (310), the image server system can count a number of pixels that appear to illustrate wildfire on each day in the predetermined number of days following Aug. 5, 2019. The image server system can generate a likelihood for each day using the second statistical distribution and the number of pixels that appear to illustrate wildfire on each corresponding day. The statistical distribution can return a probability or likelihood for each day. If each days' probability is greater than a threshold value, then the image server system can indicate with confidence that Aug. 5, 2019 is the actual end date of the fire. If one or more of the days' probability is less than a threshold, then the image server system can continue iterating forward in time to find the actual end date of the wildfire and subsequently, an entire following week of "no-fire" days.

The image server system provides, for output, a range that includes the start date of the fire and the end date of the fire within the geographical region (320). In some examples, the temporal range of the wildfire, e.g., the determined start date and end date, can be provided to one or more other pipelines and can also be provided to a display of the image server system. Additionally, the image server system can provide the temporal range to a client device of a user over a network that requested for the temporal range.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:

obtaining satellite imagery of a geographic region prior to a date when fire occurred within the geographic region;

selecting a subset of the satellite imagery, the subset captured (i) before the date when the fire occurred and (ii) does not illustrate fire;

generating a model from the subset of satellite imagery;

determining a start date of the fire using the subset of satellite imagery and the model;

obtaining other satellite imagery of the geographic region, the other satellite imagery captured (i) prior to the determined start date and (ii) after the determined start date;

selecting another subset of satellite imagery from the other satellite imagery prior to the determined start date;

generating another model from the another subset of satellite imagery prior to the determined start date;

determining an end date of the fire using the other satellite imagery and the other model; and providing, for output, the start date and the end date of the fire within the geographical region.

2. The computer-implemented method of claim 1, further comprising determining the date when the fire occurred within the geographic region comprises determining the start date of the fire, determining the end date of the fire, or determining another date of the fire within the geographic region.

3. The computer-implemented method of claim 2, wherein obtaining the satellite imagery of the geographic region prior to the date when the fire occurred within the geographic region comprises obtaining, from a database, the satellite imagery of the geographic region using (i) a location of the geographic region and (ii) the determined date when the fire occurred within the geographic region.

4. The computer-implemented method of claim 1, wherein selecting the subset of the satellite imagery, the subset captured (i) before the date when the fire occurred and (ii) does not illustrate the fire comprises:

determining a time period that represents a period of time corresponding to the date when the fire occurred;

selecting the subset of the satellite imagery according to the determined time period;

determining whether each image of the subset of the satellite imagery illustrates the fire by analyzing one or more pixels of each image;

for each image of the subset of the satellite imagery:

retrieving one or more pixels of the image;

comparing the one or more pixels to a threshold value;

determining whether the image illustrates the fire based on the comparison of the one or more pixels to the threshold value; and excluding the image from the subset of the satellite imagery based on the determination that the image illustrates the fire.

5. The computer-implemented method of claim 1, wherein generating the model from the subset of the satellite imagery comprises:

generating one or more parameters of the model, wherein the generating the one or more parameters comprises:

determining a number of pixels in the subset of the satellite imagery that likely illustrate the fire using a fire detection algorithm;

determining an average of the determined number of pixels in the subset of the satellite imagery that likely illustrate the fire; and generating the one or more parameters of the model using the determined average of the number of pixels that likely illustrate fire.

6. The computer-implemented method of claim 1, wherein determining the start date of the fire using the subset of the satellite imagery and the model comprises:

obtaining satellite imagery from the subset of satellite imagery corresponding to a particular day prior to the date when the fire occurred;

determining a number of pixels from the obtained satellite imagery for the particular day that appear to illustrate the fire;

generating a likelihood that the obtained satellite imagery from the subset of satellite imagery indicates the fire based on the generated model and the determined number of pixels that appear to illustrate the fire;

comparing the generated likelihood to a threshold value;

determining whether the generated likelihood satisfies the threshold value; and in response to determining that the generated likelihood does not exceed the threshold value, obtaining another satellite image from the subset of satellite imagery corresponding to another day prior to the date when the fire occurred for determining the start date.

7. The computer-implemented method of claim 6, wherein in response to determining that the generated likelihood does exceed the threshold value, the method comprises:

obtaining additional satellite imagery for a predetermined number of days prior to the particular day;

for each day of the predetermined number of days:

determining a number of active fire pixels for the day;

generating a likelihood that the additional satellite imagery for the day does not include an indication of the fire based on the model and the determined number of active fire pixels; and determining that the day corresponding to the obtained satellite imagery corresponds to the start date of the fire in response to determining each day of the predetermined number of days does not illustrate the fire.

8. The computer-implemented method of claim 1, wherein obtaining the other satellite imagery of the geographic region comprises retrieving, from a database, the other satellite imagery of the geographic region that illustrates the geographic region from a time period prior to and after the start date using (i) a location of the geographic region, (ii) the start date when the fire occurred.

9. The computer-implemented method of claim 1, wherein selecting the other subset of satellite imagery from the other satellite imagery prior to the determined start date comprises:

identifying a time period to generate the other model, the time period corresponding to a period prior to the start date;

selecting the other subset of satellite imagery from the other satellite imagery based on the time period;

determining an indication if one or more pixels from the selected other subset of satellite imagery illustrates fire; and for each image of the other subset of the satellite imagery:

retrieving one or more pixels of the image;

comparing the one or more pixels to a threshold value;

determining whether the image illustrates the fire based on the comparison of the one or more pixels to the threshold value; and exclude the image from the other subset of the satellite imagery based on the determination that the image illustrates the fire.

10. The computer-implemented method of claim 1, wherein generating the other model from the another subset of satellite imagery prior to the determined start date:

generating one or more parameters of the other model, wherein the generating the one or more parameters comprises:

determining a number of pixels in the other subset of the satellite imagery that likely illustrate the fire using a fire detection algorithm;

determining an average of the determined number of pixels in the subset of the other satellite imagery that likely illustrate the fire; and generating the one or more parameters of the other model using the determined average of the number of pixels that likely illustrate fire.

11. The computer-implemented method of claim 1, wherein determining the end date of the fire using the other satellite imagery and the other model comprises:

obtaining satellite imagery from the other subset of the satellite imagery corresponding to a particular day after the date when the fire occurred;

determining a number of pixels from the obtained satellite imagery for the particular day that appear to illustrate the fire;

generating a likelihood that the obtained satellite imagery from the other subset of satellite imagery indicates the fire based on the generated other model and the determined number of pixels that appear to illustrate the fire;

comparing the generated likelihood to a threshold value;

determining whether the generated likelihood satisfies the threshold value; and in response to determining that the generated likelihood does not exceed the threshold value, obtaining another satellite image from the other subset of satellite imagery corresponding to another day after the date when the fire occurred for determining the end date.

12. The computer-implemented method of claim 11, further comprising in response to determining to determining the likelihood does exceed the threshold value for the particular day, the method comprises:

obtaining additional satellite imagery for a predetermined number of days following the particular day;

for each day of the predetermined number of days:

determining a number of active fire pixels for the day;

generating a likelihood that the additional satellite imagery for the day does not include an indication of the fire based on the other model and the determined number of active fire pixels; and determining that the day corresponding to the obtained satellite imagery corresponds to the end date of the fire in response to determining each day of the predetermined number of days does not illustrate the fire.

13. The computer-implemented method of claim 1, wherein the model and the other model comprise at least one of a Poisson distribution, a Gaussian distribution, or a normal distribution.

14. A system comprising:

one or more computers and one or more storage devices storing instructions that are operable, when executed by the one or more computers, to cause the one or more computers to perform operations comprising:

obtaining satellite imagery of a geographic region prior to a date when fire occurred within the geographic region;

selecting a subset of the satellite imagery, the subset captured (i) before the date when the fire occurred and (ii) does not illustrate fire;

generating a model from the subset of satellite imagery;

determining a start date of the fire using the subset of satellite imagery and the model;

obtaining other satellite imagery of the geographic region, the other satellite imagery captured (i) prior to the determined start date and (ii) after the determined start date;

selecting another subset of satellite imagery from the other satellite imagery prior to the determined start date;

generating another model from the another subset of satellite imagery prior to the determined start date;

determining an end date of the fire using the other satellite imagery and the other model; and providing, for output, the start date and the end date of the fire within the geographical region.

15. The system of claim 14, further comprising determining the date when the fire occurred within the geographic region comprises determining the start date of the fire, determining the end date of the fire, or determining another date of the fire within the geographic region.

16. The system of claim 15, wherein obtaining the satellite imagery of the geographic region prior to the date when the fire occurred within the geographic region comprises obtaining, from a database, the satellite imagery of the geographic region using (i) a location of the geographic region and (ii) the determined date when the fire occurred within the geographic region.

17. The system of claim 14, wherein selecting the subset of the satellite imagery, the subset captured (i) before the date when the fire occurred and (ii) does not illustrate the fire comprises:

determining a time period that represents a period of time corresponding to the date when the fire occurred;

selecting the subset of the satellite imagery according to the determined time period;

determining whether each image of the subset of the satellite imagery illustrates the fire by analyzing one or more pixels of each image;

for each image of the subset of the satellite imagery:

retrieving one or more pixels of the image;

comparing the one or more pixels to a threshold value;

determining whether the image illustrates the fire based on the comparison of the one or more pixels to the threshold value; and excluding the image from the subset of the satellite imagery based on the determination that the image illustrates the fire.

18. The system of claim 14, wherein generating the model from the subset of the satellite imagery comprises:

generating one or more parameters of the model, wherein the generating the one or more parameters comprises:

determining a number of pixels in the subset of the satellite imagery that likely illustrate the fire using a fire detection algorithm;

determining an average of the determined number of pixels in the subset of the satellite imagery that likely illustrate the fire; and generating the one or more parameters of the model using the determined average of the number of pixels that likely illustrate fire.

19. The system of claim 14, wherein determining the start date of the fire using the subset of the satellite imagery and the model comprises:

obtaining satellite imagery from the subset of satellite imagery corresponding to a particular day prior to the date when the fire occurred;

determining a number of pixels from the obtained satellite imagery for the particular day that appear to illustrate the fire;

generating a likelihood that the obtained satellite imagery from the subset of satellite imagery indicates the fire based on the generated model and the determined number of pixels that appear to illustrate the fire;

comparing the generated likelihood to a threshold value;

determining whether the generated likelihood satisfies the threshold value; and in response to determining that the generated likelihood does not exceed the threshold value, obtaining another satellite image from the subset of satellite imagery corresponding to another day prior to the date when the fire occurred for determining the start date.

20. A non-transitory computer-readable medium storing software comprising instructions executable by one or more computers which, upon such execution, cause the one or more computers to perform operations comprising:

obtaining satellite imagery of a geographic region prior to a date when fire occurred within the geographic region;

selecting a subset of the satellite imagery, the subset captured (i) before the date when the fire occurred and (ii) does not illustrate fire;

generating a model from the subset of satellite imagery;

determining a start date of the fire using the subset of satellite imagery and the model;

obtaining other satellite imagery of the geographic region, the other satellite imagery captured (i) prior to the determined start date and (ii) after the determined start date;

selecting another subset of satellite imagery from the other satellite imagery prior to the determined start date;

generating another model from the another subset of satellite imagery prior to the determined start date;

determining an end date of the fire using the other satellite imagery and the other model; and providing, for output, the start date and the end date of the fire within the geographical region.

* * * * *